United States Patent
Aghighi et al.

(10) Patent No.: US 12,120,761 B2
(45) Date of Patent: Oct. 15, 2024

(54) UPLINK AWARE DUAL CONNECTIVITY

(71) Applicant: Telefonaktiebolaget LM Ericsson (publ), Stockholm (SE)

(72) Inventors: Meysam Aghighi, Linköping (SE); Linnea Faxen, Linköping (SE); Walter Müller, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 276 days.

(21) Appl. No.: 17/639,443

(22) PCT Filed: Sep. 3, 2019

(86) PCT No.: PCT/IB2019/057416
§ 371 (c)(1),
(2) Date: Mar. 1, 2022

(87) PCT Pub. No.: WO2021/044187
PCT Pub. Date: Mar. 11, 2021

(65) Prior Publication Data
US 2022/0330364 A1   Oct. 13, 2022

(51) Int. Cl.
*H04W 76/15* (2018.01)
*H04W 52/28* (2009.01)

(52) U.S. Cl.
CPC ......... *H04W 76/15* (2018.02); *H04W 52/288* (2013.01)

(58) Field of Classification Search
CPC ... H04W 76/15; H04W 72/542; H04W 24/10; H04W 8/24; H04W 52/288
See application file for complete search history.

(56) References Cited

U.S. PATENT DOCUMENTS

| | | | |
|---|---|---|---|
| 2014/0269632 A1 | 9/2014 | Blankenship et al. | |
| 2016/0255593 A1* | 9/2016 | Blankenship | H04L 5/0003 370/328 |
| 2016/0301515 A1* | 10/2016 | Ouchi | H04W 72/21 |
| 2017/0041940 A1* | 2/2017 | Falconetti | H04L 5/006 |
| 2017/0188248 A1 | 6/2017 | Müller et al. | |
| 2017/0223763 A1* | 8/2017 | Rahman | H04W 76/15 |
| 2020/0053587 A1* | 2/2020 | Liu | H04W 56/0015 |
| 2020/0296576 A1* | 9/2020 | Ouchi | H04L 5/001 |

(Continued)

OTHER PUBLICATIONS

International Search Report and Written Opinion dated May 8, 2020 for International Application No. PCT/IB2019/057416 filed Sep. 3, 2019, consisting of 11-pages.

(Continued)

*Primary Examiner* — Gary Mui
(74) *Attorney, Agent, or Firm* — Weisberg I.P. Law, P.A.

(57) ABSTRACT

A first radio access network, RAN, node in a communication network can determine whether to provide dual connectivity to a user equipment, UE, in the communication network based on an UL quality. The first RAN node can receive data indicating characteristics of an uplink, UL, channel of one or more UL channels for a second RAN node in the communication network. The first RAN node can estimate an UL quality of the UL channel based on the data. The first RAN node can determine based on the UL quality, whether to provide dual connectivity to the UE in the communication network by adding the second RAN node as a secondary node serving the UE.

17 Claims, 22 Drawing Sheets

---

Determine the data indicating characteristics of an UL channel for the second RAN node
1810

Transmit the data to the first RAN node
1820

Receive a message indicating whether the second RAN node is to provide dual connectivity to the UE by becoming a secondary node to the first RAN node
1830

(56) References Cited

U.S. PATENT DOCUMENTS

2022/0248487 A1* 8/2022 Wang .................. H04W 24/08

OTHER PUBLICATIONS

3GPP TS 36.243 V15.5.0; 3rd Generation Partnership Project; Technical Specification Group Radio Access Network; Evolved Universal Terrestrial Radio Access Network (E-UTRAN); X2 application protocol (X2AP) (Release 15), Mar. 2019, consisting of 414-pages.
3GPP TS 38.473 V15.5.0; 3rd Generation Partnership Project; Technical Specification Group Radio Access Network; NG-RAN; F1 application protocol (F1AP) (Release 15), Mar. 2019, consisting of 198-pages.
Chinese Office Action with English machine translation dated Nov. 10, 2023 for patent Application No. 201980099985.9, consisting of 24-pages.

* cited by examiner

| IE/Group Name | Presence | Range | IE type and reference | Semantics description |
|---|---|---|---|---|
| NR CGI | M | | 9.3.1.12 | |
| NR PCI | M | | INTEGER (0..1007) | Physical Cell ID |
| 5GS TAC | O | | 9.3.1.29 | 5GS Tracking Area Code |
| Configured EPS TAC | O | | 9.3.1.29a | |
| Served PLMNs | | 1..<maxnoofBPLMNs> | | Broadcast PLMNs |
| >PLMN Identity | M | | 9.3.1.14 | |
| >TAI Slice Support List | O | | Slice Support List 9.3.1.37 | Supported S-NSSAIs per TA |
| CHOICE NR-Mode-Info | M | | | |
| >FDD | | | | |
| >>FDD Info | | 1 | | |
| >>>UL FreqInfo | M | | NR Frequency Info 9.3.1.17 | |
| >>>DL FreqInfo | M | | NR Frequency Info 9.3.1.17 | |
| >>>UL Transmission Bandwidth | M | | Transmission Bandwidth 9.3.1.15 | |
| >>>DL Transmission Bandwidth | M | | Transmission Bandwidth 9.3.1.15 | |
| >TDD | | | | |
| >>TDD Info | | 1 | | |
| >>> NR FreqInfo | M | | NR Frequency Info 9.3.1.17 | |
| >>> Transmission Bandwidth | M | | Transmission Bandwidth 9.3.1.15 | |
| Measurement Timing Configuration | M | | OCTET STRING | Contains the MeasurementTimingConfiguration inter-node messages defined in TS 38.331 [8]. |
| *SSB Power* | O | | *Integer* | *Transmitted SS block power in dBm.* |
| *UL I+N* | O | | *Integer* | *Measured interference plus noise in uplink, in dBm.* |
| RANAC | O | | RAN Area Code 9.3.1.57 | |
| Extended Served PLMNs List | | 0..1 | | This is included if more than 6 Served PLMNs is to be signalled. |
| >Extended Served PLMNs Item | | 1..<maxnoofExtendedBPLMNs> | | |
| >>PLMN Identity | M | | 9.3.1.14 | |
| >>TAI Slice Support List | O | | Slice Support List 9.3.1.37 | Supported S-NSSAIs per TA |
| Cell Direction | O | | 9.3.1.78 | |

FIG. 11

| IE/Group Name | Presence | Range | IE type and reference | Semantics description |
|---|---|---|---|---|
| NR-PCI | M | | INTEGER (0..1007) | NR Physical Cell ID |
| Cell ID | M | | NR CGI 9.2.111 | |
| 5GS-TAC | O | | OCTET STRING (3) | Broadcast 5GS Tracking Area Code |
| Configured TAC | O | | OCTET STRING (2) | This is the TAC configured in the gNB, different from the 5GS TAC broadcast in the NR cell and enables application of Roaming and Access Restrictions for EN-DC as specified in TS 37.340 [32] |
| Served PLMNs | | 1..<maxnoofBPLMNs> | | Broadcast PLMNs |
| >PLMN Identity | M | | 9.2.4 | |
| CHOICE NR-Mode-Info | M | | | |
| >FDD | | | | |
| >>FDD Info | | 1 | | |
| >>>UL Freqinfo | M | | NR Frequency Info 9.2.106 | |
| >>>DL Freqinfo | M | | NR Frequency Info 9.2.106 | |
| >>>UL Transmission Bandwidth | M | | NR Transmission Bandwidth 9.2.114 | |
| >>>DL Transmission Bandwidth | M | | NR Transmission Bandwidth 9.2.114 | |
| >TDD | | | | |
| >>TDD Info | | 1 | | |
| >>>NRFreqInfo | M | | NR Frequency Info 9.2.106 | |
| >>>Transmission Bandwidth | M | | NR Transmission Bandwidth 9.2.114 | |
| Measurement Timing Configuration | M | | OCTET STRING | Contains the MeasurementTimingConfiguration inter-node message for the served cell, as defined in TS 38.331 [31] |
| SSB Power | O | | Integer | Transmitted SS block power in dBm |
| UL I+N | O | | Integer | Measured interference plus noise in uplink, in dBm |

FIG. 12

| IE/Group Name | Presence | Range | IE type and reference | Semantics description |
|---|---|---|---|---|
| NR Neighbour Information | | 1..<maxnoofNRNeighbours> | | |
| >NR Neighbour Information | | | | |
| >>NRPCI | M | | INTEGER (0..1007) | NR Physical Cell ID |
| >>NR CGI | M | | 9.2.1.11 | |
| >>5GS-TAC | O | | OCTET STRING (3) | Broadcast 5GS Tracking Area Code |
| >>Configured TAC | O | | OCTET STRING (2) | This is the TAC configured in the en-gNB, different from the 5GS TAC broadcast in the NR cell and enables application of Roaming and Access Restrictions for EN-DC as specified in TS 37.340 [32]. |
| >>Measurement Timing Configuration | M | | OCTET STRING | Contains the MeasurementTimingConfiguration inter-node message for the neighbour cell, as defined in TS 38.331 [31]. |
| >>CHOICE NR-Neighbour-Mode-Info | M | | | |
| >>>FDD | | | | |
| >>>>FDD Info | | 1 | | |
| >>>>>UL ARFCNFreqInfo | M | | NR ARFCN Frequency Info 9.2.106 | |
| >>>>>DL ARFCNFreqInfo | M | | NR ARFCN Frequency Info 9.2.106 | |
| >>>TDD | | | | |
| >>>>TDD Info | | 1 | | |
| >>>>>ARFCNNRFreqInfo | M | | NR ARFCN Frequency Info 9.2.106 | |
| SSB Power | O | | Integer | Transmitted SS block power in dBm. |
| UL I+N | O | | Integer | Measured interference plus noise in uplink, in dBm. |

FIG. 13

UPLINK AWARE DUAL CONNECTIVITY

CROSS-REFERENCE TO RELATED APPLICATIONS

This application is a Submission Under 35 U.S.C. § 371 for U.S. National Stage Patent Application of International Application Number: PCT/IB2019/057416, filed Sep. 3, 2019 entitled "UPLINK AWARE DUAL CONNECTIVITY," the entirety of which is incorporated herein by reference.

TECHNICAL FIELD

The present disclosure relates generally to communication, and more particularly to operations in a communication network and related nodes of the communication network.

BACKGROUND

5th Generation ("5G") in 3rd Generation Partnership Project ("3GPP") introduces both a new core network ("5GC") and a new radio access network ("NR"). The 5GC can, however, also support other radio access technologies ("RATs") than NR. It has been agreed that long term evolution ("LTE") (or evolved universal terrestrial radio access ("E-UTRA")) should also be connected to a 5GC and that an LTE base station that is connected to a 5GC is called a ng-eNB and is part of a 5th generation radio access network ("NG-RAN"), which can also include NR base stations ("gNBs"). FIG. 1 illustrates how base stations are connected to each other and the nodes in a 5GC.

There are different ways to deploy a 5G network with or without interworking with LTE (also referred to as E-UTRA) and an evolved packet core ("EPC"), as depicted in FIGS. 2-7. In principle, NR and LTE can be deployed without any interworking, denoted by NR stand-alone ("SA") operation, that is gNB in NR can be connected to a 5GC and an eNB can be connected to an EPC with no direct interconnection on a RAN level between the two (e.g., in FIGS. 2-3). On the other hand, the first supported version of NR is the E-UTRAN-NR Dual Connectivity ("EN-DC"), illustrated in FIG. 4. In such a deployment, dual connectivity between NR and LTE is applied with LTE as the master and NR as the secondary node. The RAN node (gNB) supporting NR, may not have a control plane connection to the EPC, instead it can rely on the LTE as master node ("MeNB"). This can also be called a non-standalone ("NSA") NR. An NR Cell can be capable of acting as a "Non-standalone cell" towards one user equipment or wireless device ("UE") at the same time as acting as a "Standalone cell" to other UE's. To be able to act as a "Standalone cell," the gNB supporting the NR cell may need to be connected to the 5GC.

With introduction of a 5GC, other options may be also valid. As mentioned above, FIG. 3 supports stand-alone NR deployment where gNB is connected to 5GC. Similarly, LTE can also be connected to 5GC as illustrated in FIG. 6 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). FIGS. 5 and 8 illustrate other variants of dual connectivity between LTE and NR which will be standardized as part of NG-RAN connected to 5GC, denoted by multi-RAT dual connectivity ("MR-DC"). EN-DC (illustrated in FIG. 4), NE-DC (illustrated in FIG. 5), NGEN-DC (illustrated in FIG. 7), and NR-DC (a variant of what is illustrated in FIG. 3) may fall under the MR-DC umbrella. FIG. 4 depicts an EN-DC in which the LTE is the master node and NR is the secondary (EPC CN employed). FIG. 5 depicts an NE-DC in which the NR is the master node and LTE is the secondary (5GCN employed). FIG. 7 depicts an NGEN-DC in which the LTE is the master node and NR is the secondary (5GCN employed). A variant of FIG. 3 could depict an NR-DC in which there is dual connectivity where both the master and secondary are NR (5GCN employed).

As migration for these options may differ from different operators, it is possible to have deployments with multiple options in parallel in the same network. For example, there could be eNB base station supporting the options illustrated in FIGS. 4, 6, and 8 in the same network as NR base station supporting the options illustrated in FIGS. 3-5. In combination with dual connectivity solutions between LTE and NR, it is also possible to support carrier aggregation ("CA") in each cell group (e.g., a master cell group ("MCG") and a secondary cell group ("SCG")) and dual connectivity between nodes of the same RAT (e.g. new radio new radio dual connectivity ("NR-NR DC")). For the LTE cells, a consequence of these different deployments is the co-existence of LTE cells associated to eNBs connected to EPC, 5GC or both EPC/5GC.

The uplink signal quality is very important for the performance of an EN-DC user because layer 2 (e.g., a media access control ("MAC") layer) acknowledgements and L1 level feedback (e.g., Channel State information) need to go back to the same RAT. If the uplink channel quality is not good enough or degraded compared the downlink channel, the user may not be able to fully use the resources of the secondary RAT.

SUMMARY

According to some embodiments, a method of operating a first radio access network ("RAN") node in a communication network is provided. The method includes receiving, by the first RAN node, data indicating characteristics of an uplink ("UL") channel of one or more UL channels for a second RAN node in the communication network. The method further includes estimating, by the first RAN node, an UL quality of the UL channel based on the data. The method further includes determining, by the first RAN node and based on the UL quality, whether to provide dual connectivity to a user equipment ("UE") in the communication network by adding the second RAN node as a secondary node serving the UE.

According to some other embodiments, a method of operating a second RAN node in a communication network is provided. The method can include determining, by the second RAN node, data indicating characteristics of an UL channel of one or more UL channels for the second RAN node. The method can further include transmitting, by the second RAN node, the data to a first RAN node in the communication network. The method can further include, responsive to transmitting the data to the first RAN node, receiving, by the second RAN node, a message indicating whether the second RAN node is to provide dual connectivity to a UE in the communication network by becoming a secondary node to the first RAN node and serving the UE.

According to some other embodiments, a method of operating a first RAN node in a communication network is provided. The method can include transmitting, by the first RAN node, data to a second RAN node in the communication network. The data can indicate characteristics of an UL channel of one or more UL channels for the second RAN node. The method can further include, responsive to transmitting the data, receiving, by the first RAN node from the second RAN node, an UL quality of the UL channel. The method can further include determining, by the first RAN node and based on the UL quality, whether to provide dual connectivity to a UE in the communication network by adding the second RAN node as a secondary node serving the UE.

According to some other embodiments, a method of operating a second RAN node in a communication network is provided. The method can include receiving, by the second RAN node, data from a first RAN node in the communication network, the data indicating characteristics of an UL channel of one or more UL channels for the second RAN node. The method can further include, responsive to receiving the data from the first RAN node, estimating, by the first RAN node, the UL quality of the UL channel based on the data. The method can further include, responsive to estimating the UL quality, transmitting, by the second RAN node, the UL quality to the first RAN node. The method can further include, responsive to transmitting the UL quality to the first RAN node, receiving, by the second RAN node, a message indicating whether the second RAN node is to provide dual connectivity to a UE in the communication network by becoming a secondary node to the first RAN node and serving the UE.

Various embodiments described herein can reduce new radio ("NR") UL failure, prevent high threshold for B1/B2 measurement reports for dual connectivity setup/traffic steering, and reduce inefficient traffic steering of dual connectivity users.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 11 is a table illustrating an example of information elements ("IEs") to be used to provide cell configuration information of a cell in the gNB-DU according to some embodiments of the present disclosure;

FIG. 12 is a table illustrating an example of IEs for serving NR cell information according to some embodiments of the present disclosure;

FIG. 13 is a table illustrating an example of IEs for providing NR neighbor information according to some embodiments of the present disclosure;

DETAILED DESCRIPTION

Figure 1:
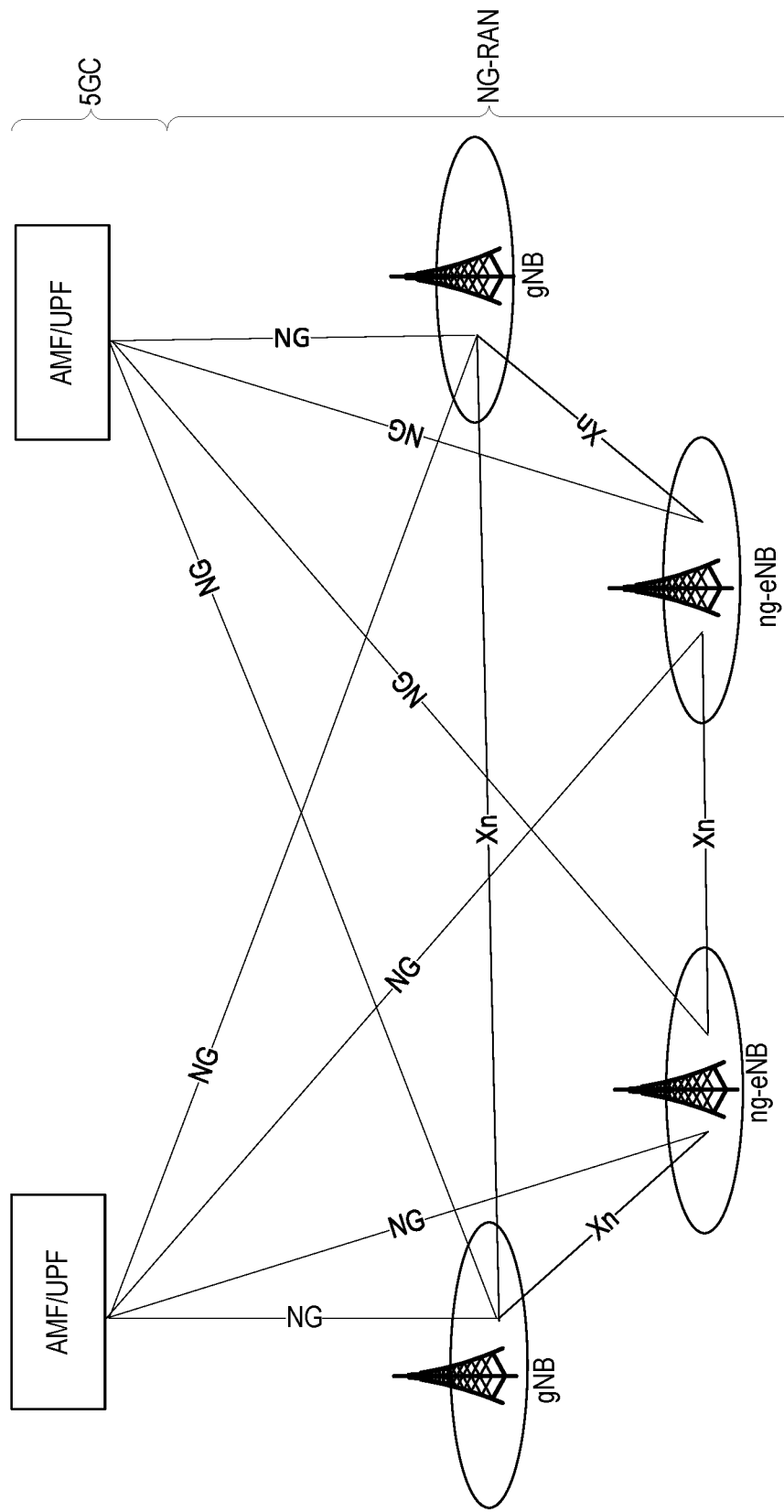
FIG. 1 is a diagram illustrating an example of 5th Generation System ("5GS") architecture including a 5GC and a NG-RAN.
Figure 2:
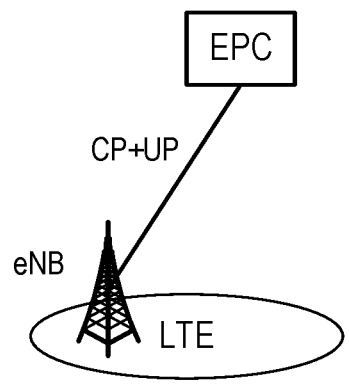
FIGS. 2-7 are diagrams illustrating examples of LTE and NR interworking options.
Figure 3:
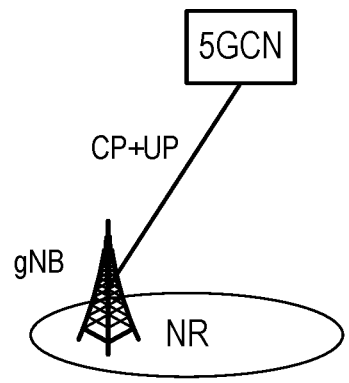
Figure 4:
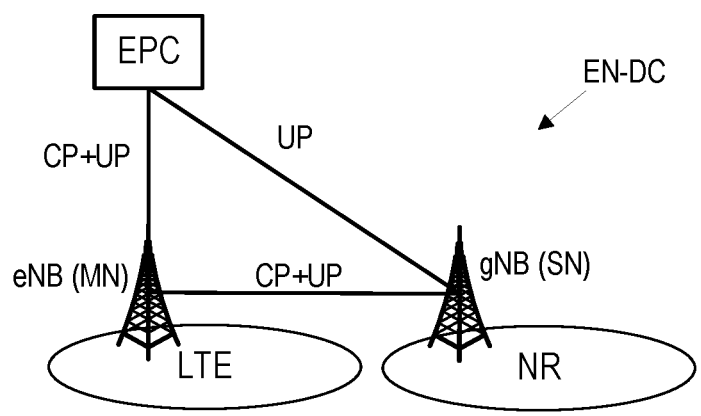
Figure 5:
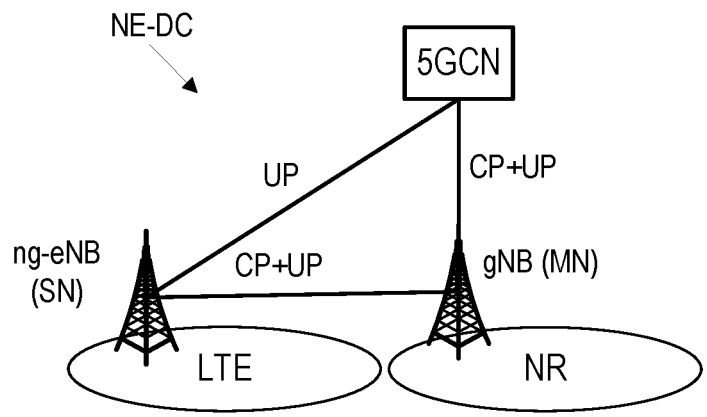
Figure 6:
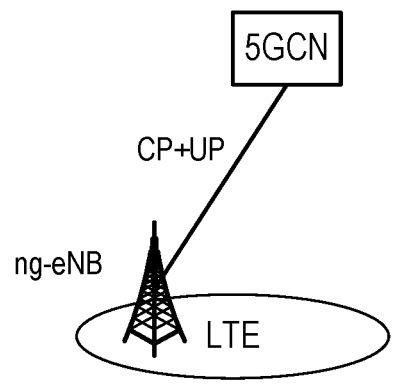
Figure 7:
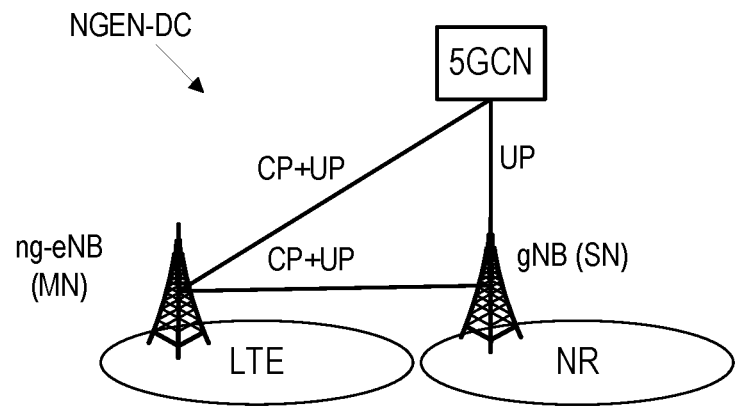

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Setup of a secondary gNB ("SgNB") can be accomplished based on UE measurement reports (e.g., reports triggered by B1/B2 measurement event conditions) or based on eNB configuration and UE capability information. In some examples, setting up the SgNB without checking the uplink channel quality can result in a good downlink channel. However, a poor uplink channel may exist and may result in NR uplink failures and wasted signaling to setup EN-DC.

There are functionalities to steer 5G (EN-DC capable) users from non-EN-DC capable LTE cells to EN-DC capable LTE cells. These traffic steering actions can be triggered by IRAT measurement events (B1 or B2). These measurements events may only indicate the power/quality of downlink channel. Therefore, the cases where the user has good downlink channel, but poor uplink channel, can result in inefficient traffic steering in LTE. In some examples, more pessimistic (higher) thresholds for B1/B2 events can be configured, but this may result in uplink and downlink channels having different conditions in different radio conditions and may result in resources not being used efficiently.

Various embodiments described herein may provide solutions for the above problems. In some embodiments, a Master eNB ("MeNB") estimates the uplink channel before the attempt to add a Secondary gNB ("SgNB") or steer EN-DC users to another LTE cell for the purpose of setting up EN-DC. To do the estimation, the MeNB may use some information from the SgNB such as transmitted power on SSB and/or channel state information reference signal ("CSI-RS").

Some embodiments described herein can reduce NR uplink failure, remove the need to configure high thresholds for B1/B2 measurement reports for EN-DC setup/traffic steering, and/or reduce inefficient traffic steering of EN-DC users.

Some embodiments may provide signaling in the network so that it would be possible to do an evaluation of the UL channel before an uplink failure or an inefficient traffic steering happens. This signaling can include information between nodes (over X2 interface, between MeNB and SgNB for EN-DC) and also within gNB (over F1 interface between DU and CU).

In some embodiments, a source eNB estimates the NR UL. The source eNB can estimate the NR UL based on: UE reported B1 event with measured RSRP on NR cell SSB/CSI-RS; NR cell transmitted power on SSB/CSI-RS (UE pathloss to NR cell); NR cell UL BB measured interference+noise (current I+N situation to be expected after starting to use NR cell UL); and/or configured/achievable maximum UE power on NR cell UL (how much UL margins will link adaptation have for this UE at the current position if connected to NR Cell UL). The source eNB may receive information about SSB power from the gNB during X2 setup. Furthermore, the gNB may transmit updated UL measured interference and noise ("I+N") to the eNB during an X2 configuration update. In some embodiments, a BB in the gNB and the eNB to estimate UL interference by using IQ data received from UL when UL is used by the UE.

Figure 8:
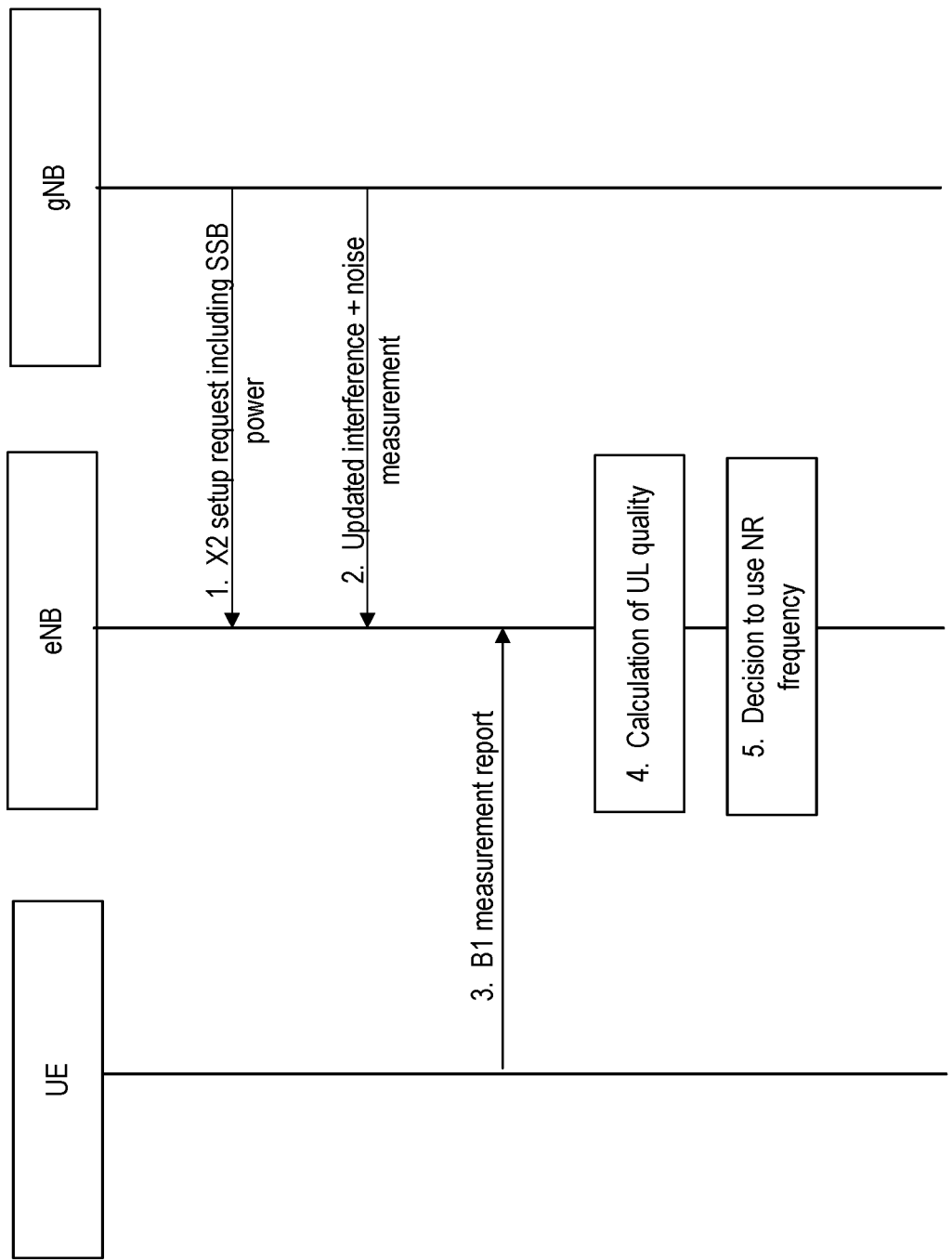
FIG. 8 is a signal flow diagram illustrating an example of a procedure for estimating the NR uplink ("UL") quality for use in improving an EN-DC setup according to some embodiments of the present disclosure.

FIG. 8 depicts an example of a signal flow diagram of a procedure for estimating the NR UL quality for the use of improving the EN-DC setup. An X2 setup request can be transmitted from the gNB to the eNB. In the X2 setup message, the NR cell transmitted power on SSB/CSI-RS can be included. Measured UL interference plus noise in the NR cell can be sent to the eNB, as soon as it needs to be updated. This information can be included in the X2 configuration update or some other message. Separately, the UE can report a B1 measurement. In response to receiving the B1 measurement report, the eNB can calculate the UL quality of the NR cell based on the NR cell transmit power, interference plus noise situation, and measured reference signal received power ("RSRP") received. Once the UL quality has been calculated, it can be included in the decision in the eNB to for example, either setup EN-DC to this NR cell, or change to a PCell which better can utilize the NR cell, or to wait for better measurements.

Some embodiments include adding SSB power and updated interference plus noise in uplink to served cell information in 3GPP TS 38.473 (F1 Application Protocol). An example is added in the bolded section of the table in FIG. 11. This IE includes cell configuration information of a cell in the gNB-DU. This may allow DU to send the SSB power and measured I+N in UL to CU.

Additional or alternative embodiments include adding the same IEs to served NR cell information in 3GPP TS 36.423 (X2 Application Protocol). An example is added in the bolded section of the table in FIG. 12. This IE includes cell configuration information of an NR cell that a neighbour eNB may need for the X2 AP interface.

In additional or alternative embodiments, the gNB can estimate the NR UL quality for each specific UE. The target gNB estimates the NR UL for each specific UE based on: UE reported B1 event with measured RSRP on NR cell SSB/CSI-RS provided to target gNB via X2; NR cell transmitted power on SSB/CSI-RS (UE pathloss to NR cell); NR cell UL BB measured interference+noise (current I+N situation to be expected after starting to use NR cell UL); and configured/achievable maximum UE power on NR cell UL provided to target gNB via X2 (how much UL margins will link adaptation have for this UE at the current position if connected to NR Cell UL). The eNB may transmit information to the gNB about UE measured target RSRP to gNB. The eNB may further transmit information to the gNB about configured/achievable maximum UE power on NR cell UL.

Figure 9:
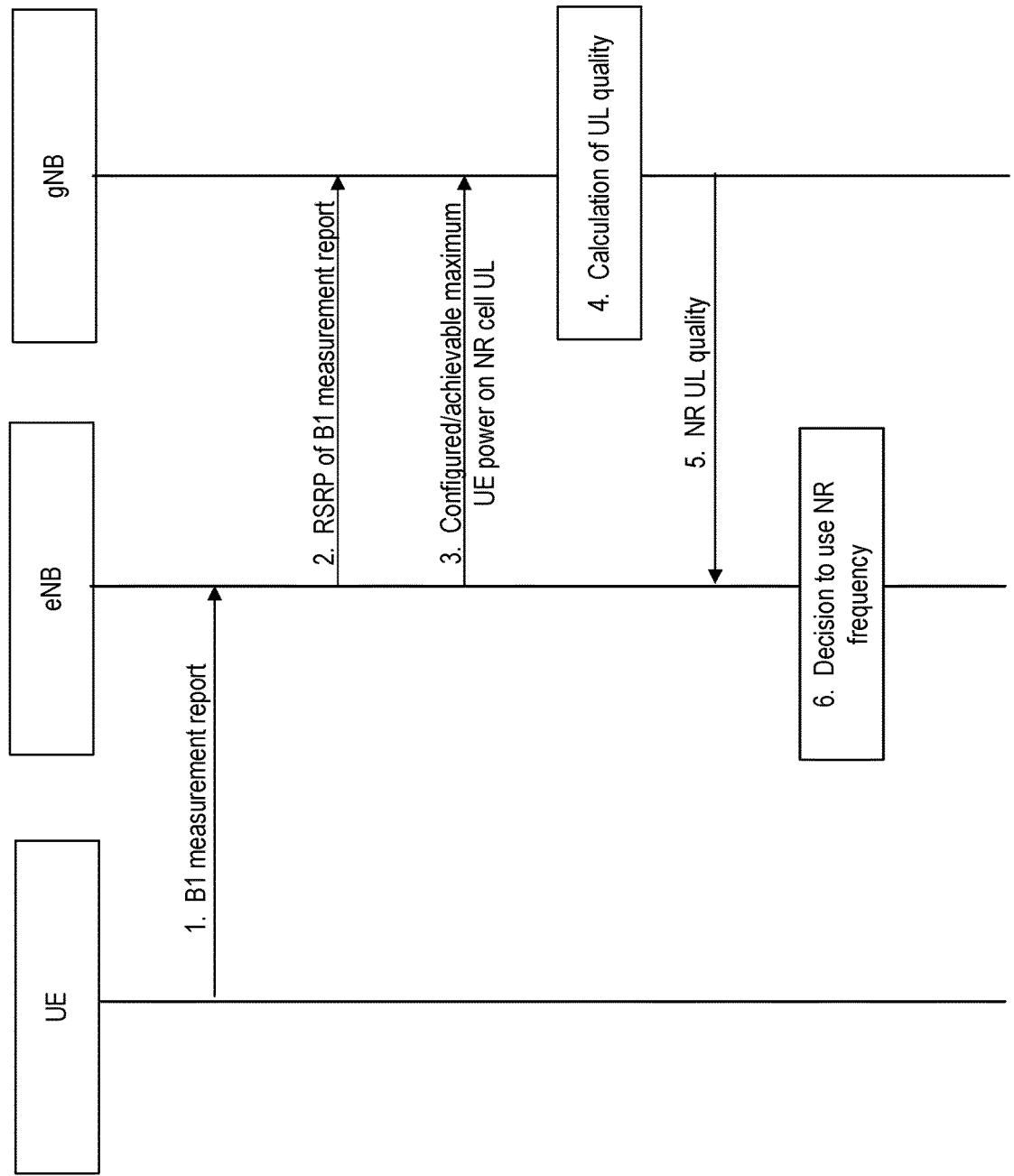
FIG. 9 is a signal flow diagram illustrating an example of a procedure for a gNB to estimate the NR UL quality for each specific UE according to some embodiments of the present disclosure.

FIG. 9 depicts an example of a signal flow for a gNB estimating the NR UL quality. In this example, first, the UE reports a B1 measurement. Then the eNB forwards the RSRP of the measurement report to the gNB (or the whole measurement report). Next, the eNB transmits the configured/achievable maximum UE power on NR cell UL to the gNB. Then the gNB calculates the NR UL quality based on the RSRP measurement, NR transmit power, NR interference plus noise situation, and configured/achievable maximum UE power. The calculated NR quality is forwarded to the eNB. Once the UL quality has been calculated it can be included in the decision in the eNB to for example, either setup EN-DC to this NR cell, or change to a PCell which better can utilize the NR cell, or to wait for better measurements.

In some embodiments, the B1 measurement and the configured/achievable maximum UE power on NR are sent in the SGNB ADDITION REQUEST message from eNB to gNB. Also, the DU may send the SSB power and measured I+N in UL to CU. Then CU may decide whether UL is good enough or not (SGNB ADDITION REQUEST will be accepted or rejected).

In additional or alternative embodiments, the eNB can send the information received from the gNB (SSB power and UL measured interference plus noise) to other eNBs that it is connected to via X2, to prevent traffic steering of EN-DC users for EN-DC purpose. In one example, SSB power and updated interference plus noise in uplink that is received from the gNB can be added to the NR neighbor information IE in 3GPP TS 36.423 (X2 Application Protocol). An example is added in the bolded section of the table in FIG. 13. This IE can include cell configuration information of NR cells that a neighbour node may need for the X2 AP interface.

In additional or alternative embodiments, the EN-DC can be replaced with other MR-DC options (e.g. NE-DC, etc.) and respectively, the nodes (eNB, gNB) and interfaces (X2, XN).

Figure 10:
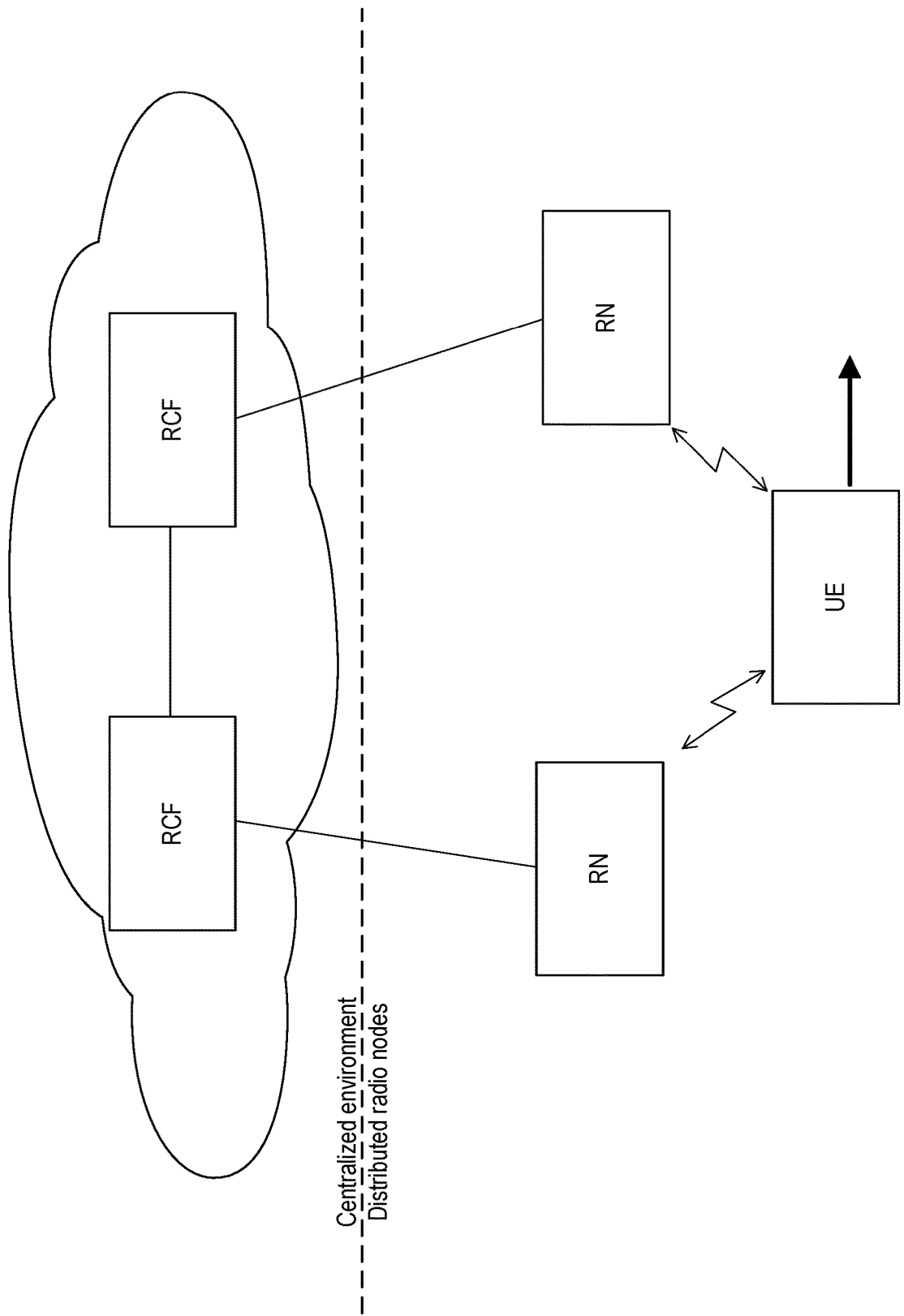
FIG. 10 is a block diagram illustrating an example of a cloud based implementation according to some embodiments of the present disclosure.

FIG. 10 depicts an example of a cloud based embodiment. In this example, E-UTRAN or NG-RAN may be in the Radio Control Function (RCF) in an eNB, gNB or ng-eNB. The physical location of the RCF may be close to the Radio Node (RN) or in a data center or on another hardware entity somewhere in-between.

Figure 14:
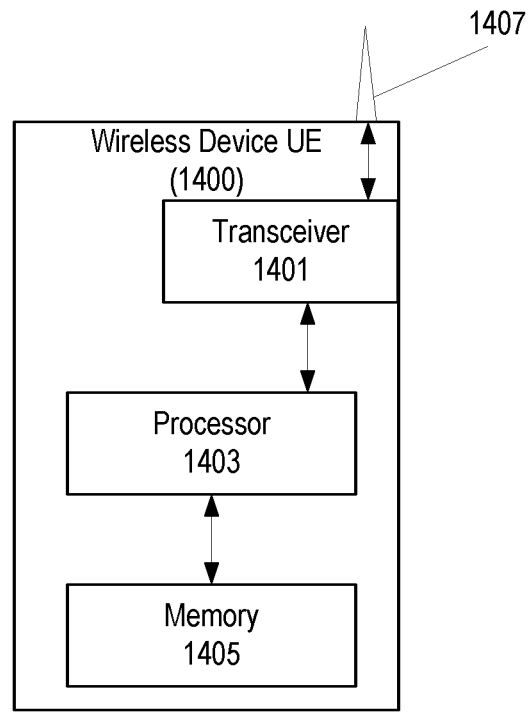
FIG. 14 is a block diagram illustrating an example of a wireless device ("UE") according to some embodiments of the present disclosure.

FIG. 14 is a block diagram illustrating elements of a wireless device UE 1400 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 1400 may be provided, for example, as discussed below with respect to wireless device QQ110 of FIG. 21.) As shown, wireless device UE may include an antenna 1407 (e.g., corresponding to antenna QQ111 of FIG. 21), and transceiver circuitry 1401 (also referred to as a transceiver, e.g., corresponding to interface QQ114 of FIG. 21) including a transmitter and a receiver configured to provide uplink and downlink radio communications with a base station(s) (e.g., corresponding to network node QQ160 of FIG. 21) of a radio access network. Wireless device UE may also include processing circuitry 1403 (also referred to as a processor, e.g., corresponding to processing circuitry QQ120 of FIG. 21) coupled to the transceiver circuitry, and memory circuitry 1405 (also referred to as memory, e.g., corresponding to device readable medium QQ130 of FIG. 21) coupled to the processing circuitry. The memory circuitry 1405 may include computer readable program code that when executed by the processing circuitry 1403 causes the processing circuitry to perform operations according to embodiments disclosed herein. According to other embodiments, processing circuitry 1403 may be defined to include memory so that separate memory circuitry is not required. Wireless device UE may also include an interface (such as a user interface) coupled with processing circuitry 1403, and/or wireless device UE may be incorporated in a vehicle.

As discussed herein, operations of wireless device UE may be performed by processing circuitry 1403 and/or transceiver circuitry 1401. For example, processing circuitry 1403 may control transceiver circuitry 1401 to transmit communications through transceiver circuitry 1401 over a radio interface to a radio access network node (also referred to as a base station) and/or to receive communications through transceiver circuitry 1401 from a RAN node over a radio interface. Moreover, modules may be stored in memory circuitry 1405, and these modules may provide instructions so that when instructions of a module are executed by processing circuitry 1403, processing circuitry 1403 performs respective operations.

Figure 15:
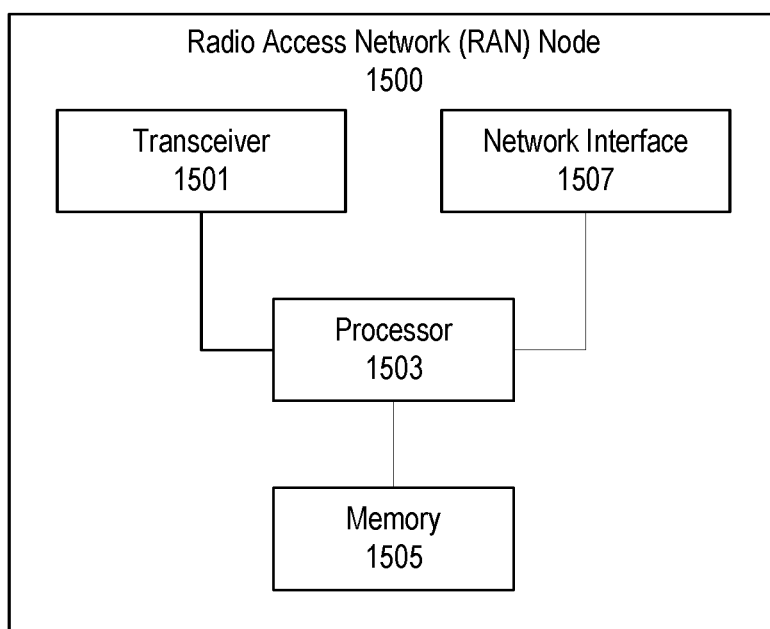
FIG. 15 is a block diagram illustrating an example of a radio access network ("RAN") node (e.g., a base station eNB/gNB) according to some embodiments of the present disclosure.

FIG. 15 is a block diagram illustrating elements of a radio access network RAN node 1500 (also referred to as a network node, base station, eNodeB/eNB, gNodeB/gNB, etc.) of a Radio Access Network (RAN) configured to provide cellular communication according to embodiments of inventive concepts. (RAN node 1500 may be provided, for example, as discussed below with respect to network node QQ160 of FIG. 21.) As shown, the RAN node may include transceiver circuitry 1501 (also referred to as a transceiver, e.g., corresponding to portions of interface QQ190 of FIG. 21) including a transmitter and a receiver configured to provide uplink and downlink radio communications with mobile terminals. The RAN node may include network interface circuitry 1507 (also referred to as a network interface, e.g., corresponding to portions of interface QQ190 of FIG. 21) configured to provide communications with other nodes (e.g., with other base stations) of the RAN and/or core network CN. The network node may also include a processing circuitry 1503 (also referred to as a processor, e.g., corresponding to processing circuitry QQ170) coupled to the transceiver circuitry, and a memory circuitry 1505 (also referred to as memory, e.g., corresponding to device readable medium QQ180 of FIG. 21) coupled to the processing circuitry. The memory circuitry 1505 may include computer readable program code that when executed by the processing circuitry 1503 causes the processing circuitry to perform operations according to embodiments disclosed herein. According to other embodiments, processing circuitry 1503 may be defined to include memory so that a separate memory circuitry is not required.

As discussed herein, operations of the RAN node may be performed by processing circuitry 1503, network interface 1507, and/or transceiver 1501. For example, processing circuitry 1503 may control transceiver 1501 to transmit downlink communications through transceiver 1501 over a radio interface to one or more mobile terminals UEs and/or to receive uplink communications through transceiver 1501 from one or more mobile terminals UEs over a radio interface. Similarly, processing circuitry 1503 may control network interface 1507 to transmit communications through network interface 1507 to one or more other network nodes and/or to receive communications through network interface from one or more other network nodes. Moreover, modules may be stored in memory 1505, and these modules may provide instructions so that when instructions of a module are executed by processing circuitry 1503, processing circuitry 1503 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 16:
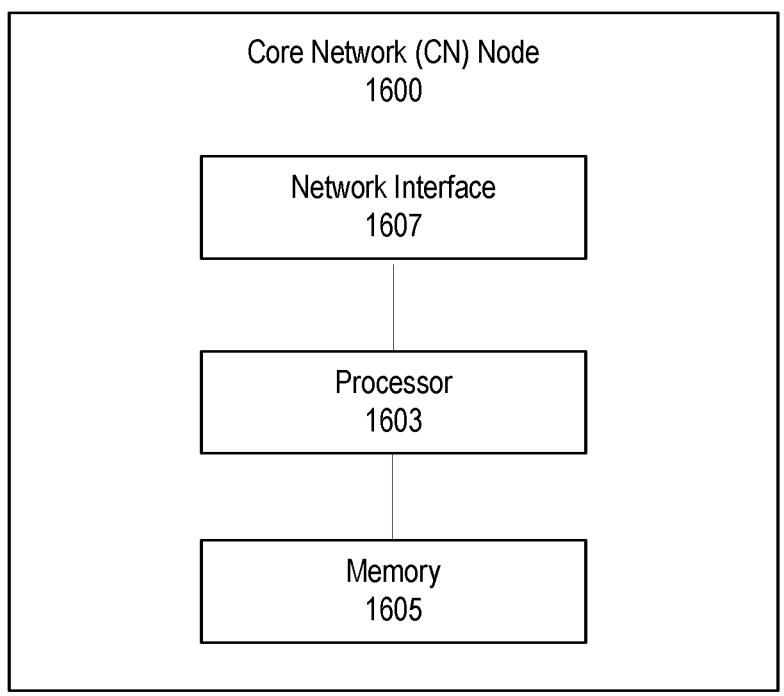
FIG. 16 is a block diagram illustrating an example of a core network ("ON") node (e.g., an AMF node, an SMF node, an OAM node, etc.) according to some embodiments of the present disclosure.

FIG. 16 is a block diagram illustrating elements of a core network CN node 1600 (e.g., an SMF node, an AMF node, etc.) of a communication network configured to provide cellular communication according to embodiments of inventive concepts. As shown, the CN node 1600 may include network interface circuitry 1607 (also referred to as a network interface) configured to provide communications with other nodes of the core network and/or the radio access network RAN. The CN node 1600 may also include a processing circuitry 1603 (also referred to as a processor) coupled to the network interface circuitry, and memory circuitry 1605 (also referred to as memory) coupled to the processing circuitry. The memory circuitry 1605 may include computer readable program code that when executed by the processing circuitry 1603 causes the processing circuitry to perform operations according to embodiments disclosed herein. According to other embodiments, processing circuitry 1603 may be defined to include memory so that a separate memory circuitry is not required.

As discussed herein, operations of the CN node 1600 may be performed by processing circuitry 1603 and/or network interface circuitry 1607. For example, processing circuitry 1603 may control network interface circuitry 1607 to transmit communications through network interface circuitry 1607 to one or more other network nodes and/or to receive communications through network interface circuitry from one or more other network nodes. Moreover, modules may be stored in memory 1605, and these modules may provide instructions so that when instructions of a module are executed by processing circuitry 1603, processing circuitry 1603 performs respective operations.

Operations of RAN node 1500 will now be discussed with reference to FIGS. 17-20 according to some embodiments of inventive concepts. For example, modules (also referred to as units) may be stored in memory 1505 of FIG. 15, and these modules may provide instructions so that when the instructions of a module are executed by processor 1503, processor 1503 performs respective operations of the flow charts of FIGS. 17-20.

Figure 17:
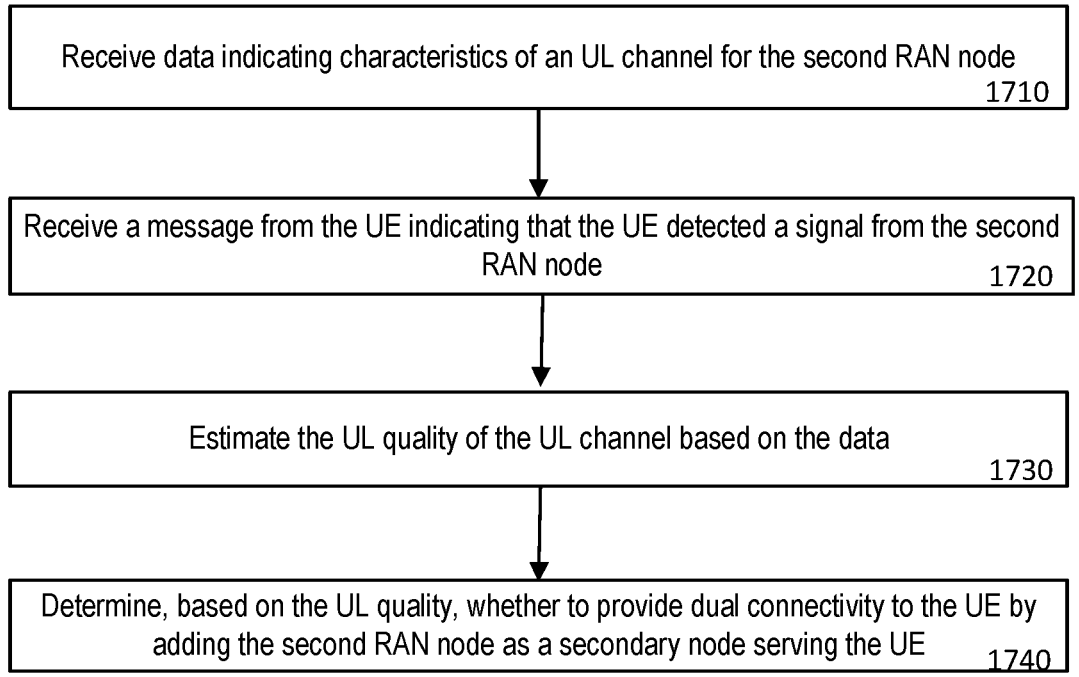
FIG. 17 is a flow diagram illustrating an example of a process for determining whether to provide dual connectivity to a UE based on an UL quality according to some embodiments of the present disclosure.

FIG. 17 depicts a flow chart illustrating an example of a process for operating a first RAN node in a communication network to determine whether to provide dual connectivity to a UE by adding a second RAN node as a secondary node serving the UE. Although the process of FIG. 17 is described below in reference to the RAN node 1500, the process may be performed by any suitable network node.

At block 1710, processor 1503 receives, via network interface 1507, data indicating characteristics of an UL channel for the second RAN node. The UL channel can be one UL channel of a plurality of UL channels for the second RAN node. In some examples, the UL channel may be between the second RAN node and a UE in the communication network. In some embodiments, the data includes first data indicating a transmit power used by the second RAN node to transmit a downlink ("DL") signal; second data indicating UL interference and noise ("I+N") in the UL channel; and third data indicating a receive power of the signal detected by the UE from the second RAN node. In additional or alternative embodiments, the first data and the second data can be received from the second RAN node and the third data can be received from the UE. In additional or alternative embodiments, the transmit power is secondary synchronization signal (SSS) power and the receive power is synchronized signal reference signal receive power ("SS-RSRP"). In additional or alternative embodiments, the transmit power is channel state information reference signal ("CSI-RS") power and the receive power is channel state information reference signal receive power ("CSI-RSRP").

In some embodiments, the first RAN node is a long term evolution ("LTE") base station ("eNB") and the second RAN node is a 5th Generation ("5G") base station ("gNB"). In additional or alternative embodiments, the first RAN node is a gNB and the second RAN node is an eNB. At least a portion of the data can be received by the first RAN node as part of an X2 interface setup message from the second RAN node. In additional or alternative embodiments, the first RAN node is a gNB and the second RAN node is a gNB. At least a portion of the data can be received by the first RAN node as part of an Xn interface setup request message from the second RAN node. In additional or alternative embodiments, the first RAN node is an eNB and the second RAN node is an eNB.

At block 1720, processor 1503 receives, via network interface 1507, a message from the UE indicating that the UE detected a signal from the second RAN node. In some embodiments, the message can indicate the receive power of the signal detected by the UE from the second RAN node. In additional or alternative embodiments, the message may indicate transmit capabilities or transmit limitations of the UE.

At block 1730, processor 1503 estimates the UL quality of the UL channel based on the data. In some embodiments, estimating the UL quality can be responsive to receiving the message from the UE indicating that the UE detected the signal from the second RAN node. In additional or alternative embodiments, estimating the UL quality includes estimating a path loss based on the transmit power, the receive power, and the I+N. Furthermore, the processor 1503 can determine transmit capabilities of the UE based on limitations of the UE and restrictions placed on the transmit capabilities of the UE by the communication network. In some embodiments, estimating the UL quality is performed prior to setting up dual connectivity to the UE using the first RAN node and the second RAN node.

At block 1740, processor 1503 determines, based on the UL quality, whether to provide dual connectivity to the UE by adding the second RAN node as a secondary node serving the UE.

In additional or alternative embodiments, processor 1503 can, responsive to determining to provide dual connectivity to the UE, initiate setup of the second RAN node as a secondary node serving the UE.

In additional or alternative embodiments, processor 1503 can, responsive to determining to not provide dual connectivity to the UE, provide stand-alone connectivity to the UE. Responsive to providing the stand-alone connectivity to the UE, processor 1503 can receive, via network interface 1507, updated data indicating updated characteristics of the UL channel for the second RAN node. Processor 1503 can estimate an updated UL quality of the UL channel based on the updated data. Processor 1503 can redetermine, based on the updated UL quality, whether to provide dual connectivity to the UE by adding the second RAN node as a secondary node serving the UE.

In additional or alternative embodiments, processor 1503 can, responsive to determining to not provide dual connectivity to the UE, determine carrier aggregation based on the UL quality. In some alternative embodiments, the processor 1503 can determine carrier aggregation instead of determining whether to provide dual connectivity to the UE.

In additional or alternative embodiments, processor 1503 can, responsive to determining to not provide dual connectivity to the UE, provide stand-alone connectivity to the UE. Responsive to providing the stand-alone connectivity to the UE, processor 1503 can receive, via network interface 1507, updated data indicating updated transit power used by the second RAN node or updated receive power detected by the UE. Processor 1503 can redetermine, based on the updated transmit power or the updated receive power, whether to provide dual connectivity to the UE by adding the second RAN node as a secondary node serving the UE.

Figure 18:
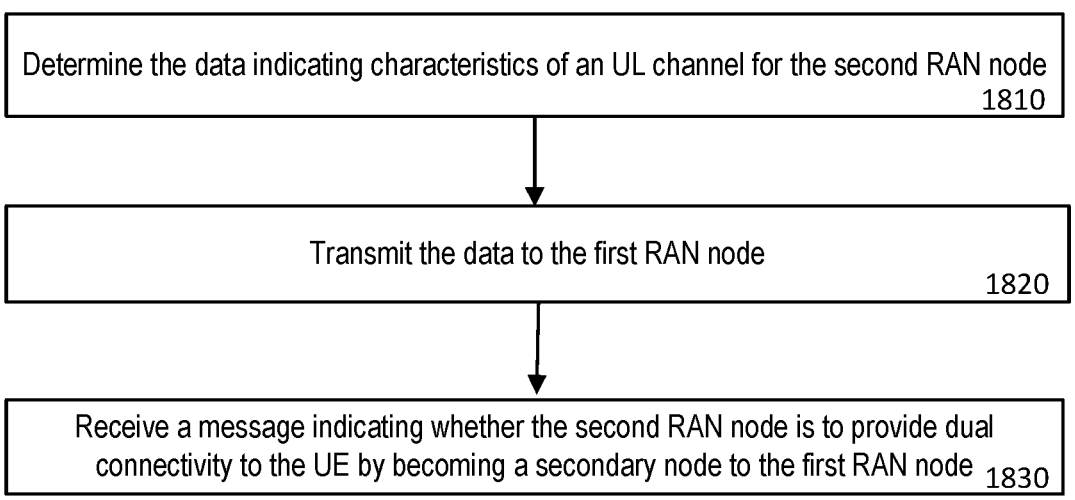
FIG. 18 is a flow diagram illustrating an example of another process for determining whether to provide dual connectivity to a UE based on an UL quality according to some embodiments of the present disclosure.

FIG. 18 depicts a flow chart illustrating an example of a process for operating a second RAN node in a communication network to determine whether to provide dual connectivity to a UE by adding the second RAN node as a secondary node serving the UE. Although the process of FIG. 18 is described below in reference to the RAN node 1500, the process may be performed by any suitable network node.

At block 1810, processor 1503 determines the data indicating characteristics of an UL channel for the second RAN node. The UL channel can be one of multiple UL channels for the second RAN node. In some embodiments, the data includes first data indicating a transmit power used by the second RAN node to transmit downlink ("DL") signals and second data indicating UL interference and noise ("I+N") in the UL channel. In additional or alternative embodiments, the transmit power is Secondary synchronization signal (SSS) power. In additional or alternative embodiments, the transmit power is channel state information reference signal ("CSI-RS") power.

At block 1820, processor 1503 transmits, via network interface 1507, the data to the first RAN node. In some embodiments, the first RAN node is a long term evolution ("LTE") base station ("eNB") and the second RAN node is a 5$^{th}$ Generation ("5G") base station ("gNB"). In additional or alternative embodiments, the first RAN node is a gNB and the second RAN node is an eNB. Transmitting the data can include transmitting an X2 interface setup message to the first RAN node, the X2 interface setup message including at least a portion of the data. In additional or alternative embodiments, the first RAN node is a gNB and the second RAN node is an gNB. Transmitting the data can include transmitting an Xn interface setup message to the first RAN node, the Xn interface setup message including at least a portion of the data. In additional or alternative embodiments, the first RAN node is an eNB and the second RAN node is an eNB.

At block 1830, processor 1503 receives, via network interface 1507, a message indicating whether the second RAN node is to provide dual connectivity to the UE by becoming a secondary node to the first RAN node. In some embodiments, the message is received prior to setting up dual connectivity to the UE using the first RAN node and the second RAN node.

In some embodiments, responsive to receiving the message indicating the second RAN node is to provide dual connectivity to the UE, processor 1503 can provide dual connectivity to the UE and initiate setup of the second RAN node as the secondary node serving the UE. In additional or alternative embodiments, responsive to receiving the message indicating the second RAN node is not to provide dual connectivity to the UE, processor 1503 can determine updated data indicating updated characteristics of the UL channel for the second RAN node. Processor 1503 can further determine that a difference between the data and the updated data exceeds a threshold value. Processor 1503 can transmit, responsive to determining the difference exceeds the threshold, the updated data to the first RAN node. Processor 1503 can, responsive to transmitting the updated data, receive another message indicating whether the second RAN node is to provide dual connectivity to the UE by becoming a secondary node to the first RAN node that serves the UE.

Figure 19:
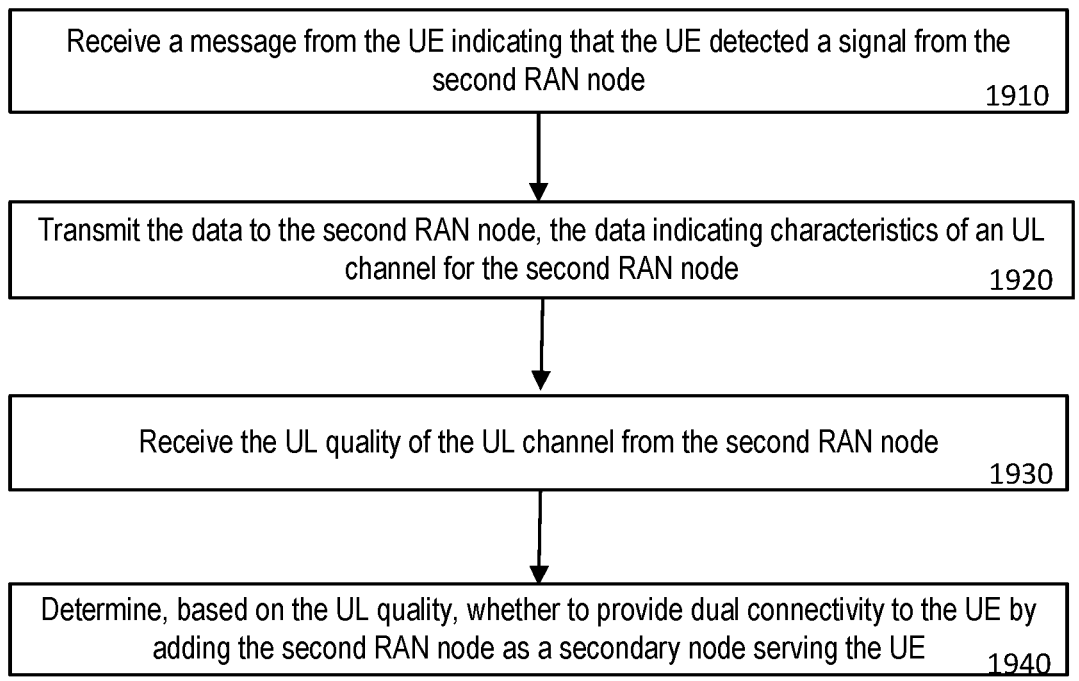
FIG. 19 is a flow diagram illustrating an example of another process for determining whether to provide dual connectivity to a UE based on an UL quality according to some embodiments of the present disclosure.

FIG. 19 depicts a flow chart illustrating an example of a process for operating a first RAN node in a communication network to determine whether to provide dual connectivity to a UE by adding a second RAN node as a secondary node serving the UE. Although the process of FIG. 19 is described below in reference to the RAN node 1500, the process may be performed by any suitable network node.

At block 1910, processor 1503 receives, via network interface 1507, a message from the UE indicating that the UE detected a signal from the second RAN node.

At block 1920, processor 1503 transmits, via network interface 1507, the data to the second RAN node. The data can indicate characteristics of an UL channel for the second RAN node. The UL channel can be one UL channel of multiple UL channels for the second RAN node. In some embodiments, processor 1503 transmits the data in response to receiving the message from the UE indicating that the UE detected the signal from the second RAN node.

In some embodiments, the data includes: first data indicating a receive power of the signal from the second RAN node detected by the UE; and second data indicating UL transmit capabilities of the UE. In additional or alternative embodiments, processor 1503 receives, via network interface 1507 the first data from the UE. In additional or alternative embodiments, processor 1503 receives, via network interface 1507, transmit limitations of the UE from the UE. In additional or alternative embodiments, processor 1507 determines transmit restrictions placed on the UE by the communication network. In additional or alternative embodiments, processor 1503 determines the second data indicating UL transmit capabilities of the UE based on the transmit limitations of the UE and the transmit restrictions placed on the UE.

In some embodiments, the receive power is secondary synchronization signal reference signal receive power ("SS-RSRP"). In additional or alternative embodiments, the receive power is channel state information reference signal receive power ("CSI-RSRP").

In some embodiments, the first RAN node is a long term evolution ("LTE") base station ("eNB") and the second RAN node is a 5th Generation ("5G") base station ("gNB"). In additional or alternative embodiments, the first RAN node is a gNB and the second RAN node is an eNB. Transmitting the data can include transmitting, by the first RAN node, an X2 interface setup message to the second RAN node, the X2 interface setup message including at least a portion of the data. In additional or alternative embodiments, the first RAN node is a gNB and the second RAN node is a gNB. Transmitting the data can include transmitting, by the first RAN node, an Xn interface setup message to the second RAN node, the Xn interface setup message including at least a portion of the data. In additional or alternative embodiments, the first RAN node is an eNB and the second RAN node is an eNB.

At block 1930, processor 1503 receives, via network interface 1507, a UL quality of the UL channel from the second RAN node. In some embodiments, receiving the UL quality is performed prior to setting up dual connectivity to the UE using the first RAN node and the second RAN node.

At block 1940, processor 1503 determines, based on the UL quality, whether to provide dual connectivity to the UE by adding the second RAN node as a secondary node serving the UE. In some embodiments, determining whether to provide dual connectivity to the UE includes determining whether the UL quality exceeds a threshold value.

In additional or alternative embodiments, responsive to determining to provide dual connectivity to the UE, processor 1503 initiates setup of the second RAN node as a secondary node serving the UE.

In additional or alternative embodiments, responsive to determining to not provide dual connectivity the UE, processor 1503 can determine carrier aggregation based on the UL quality. In some alternative embodiments, the processor 1503 can determine carrier aggregation instead of determining whether to provide dual connectivity to the UE.

In additional or alternative embodiments, responsive to determining to not provide dual connectivity to the UE, processor 1503 provides stand-alone connectivity to the UE. Responsive to providing stand-alone connectivity to the UE, processor 1503 can receive a subsequent message from the UE indicating that the UE detected a subsequent signal from the second RAN node. Responsive to receiving the subsequent message, processor 1503 can transmit, to the second RAN node, updated data indicating updated characteristics of the UL channel for the second RAN node. Responsive to transmitting the updated data, processor 1503 can receive, via network interface 1507, an updated UL quality of the UL channel for the second RAN node or an updated transmit power of the second RAN node. Processor 1503 can redetermining, based on the updated UL quality or the updated transmit power, whether to provide dual connectivity to the UE by adding the second RAN node as the secondary node serving the UE.

Figure 20:
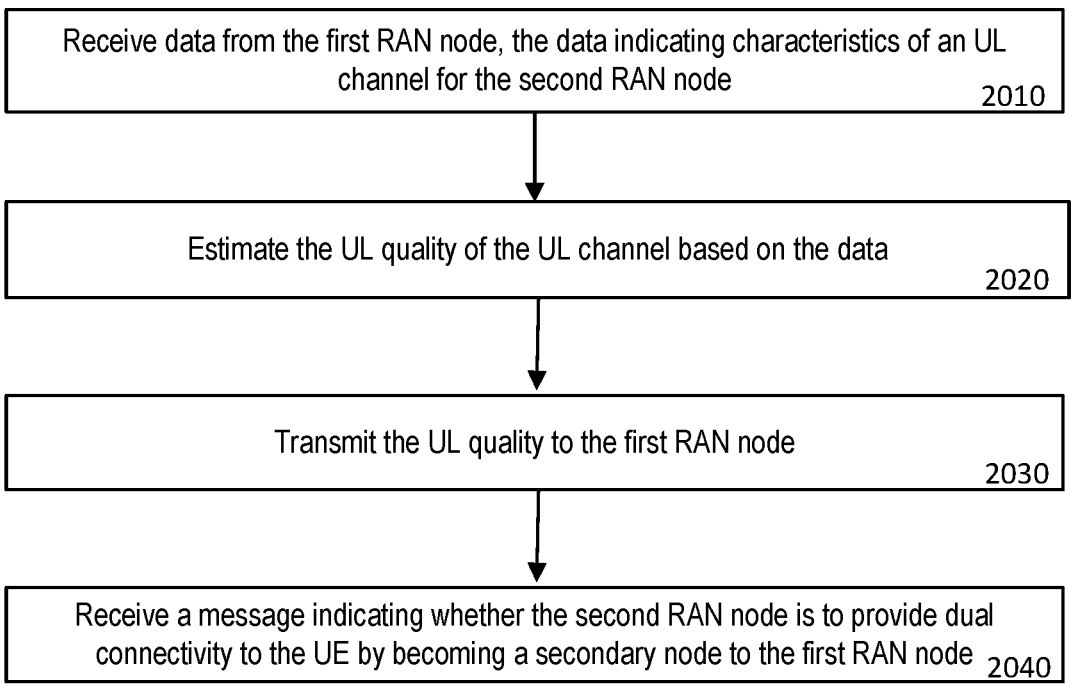
FIG. 20 is a flow diagram illustrating an example of another process for determining whether to provide dual connectivity to a UE based on an UL quality according to some embodiments of the present disclosure.

FIG. 20 depicts a flow chart illustrating an example of a process for operating a second RAN node in a communication network to determine whether to provide dual connectivity to a UE by adding the second RAN node as a secondary node serving the UE. Although the process of FIG. 20 is described below in reference to the RAN node 1500, the process may be performed by any suitable network node.

At block 2010, processor 1503 receives, via network interface 1507, data from the first RAN node. The data can indicate characteristics of an UL channel for the second RAN node. The UL channel can be one UL channel of multiple UL channels for the second RAN node. The data can include first data indicating a receive power of a signal transmitted by the second RAN node and detected by the UE and second data indicating transmit capabilities of the UE. In some embodiments, the first data and the second data can be received from the first RAN node.

In some embodiments, the first RAN node is a long term evolution ("LTE") base station ("eNB") and the second RAN node is a 5th Generation ("5G") base station ("gNB"). In additional or alternative embodiments, the first RAN node is a gNB and the second RAN node is an eNB. Receiving the data can include receiving, by the second RAN node, an X2 interface setup message from the first RAN node, the X2 interface setup message including at least a portion of the data. In additional or alternative embodiments, the first RAN node is a gNB and the second RAN node is an gNB. Receiving the data can include receiving, by the second RAN node, an Xn interface setup message from the first RAN node, the Xn interface setup message including at least a portion of the data. In additional or alternative embodiments, the first RAN node is an eNB and the second RAN node is an eNB.

At block 2020, processor 1503 estimates the UL quality of the UL channel based on the data. In some embodiments, processor 1503 can estimate a transmit power used by the second RAN node to transmit downlink ("DL") signals. Processor 1503 can further estimate UL interference and noise ("I+N") in the UL channel. Estimating the UL quality can include estimating a path loss based on the transmit power, the receive power, and the I+N. Processor 1503 can estimate a strength of a potential UL signal transmit by the UE based on the transmit capabilities of the UE and the path loss. In some embodiments, the transmit power is Secondary synchronization signal (SSS) power and the receive power is synchronized signal reference signal receive power ("SS-RSRP"). In additional or alternative embodiments, the transmit power is channel state information reference signal ("CSI-RS") power and the receive power is channel state information reference signal receive power ("CSI-RSRP").

In some embodiments, estimating the UL quality is performed prior to setting up dual connectivity to the UE using the first RAN node and the second RAN node.

At block 2030, processor 1503 transmits, via network interface 1507, the UL quality to the first RAN node.

At block 2040, processor 1503 receives, via network interface 1507, a message indicating whether the second RAN node is to provide dual connectivity to the UE by becoming a secondary node to the first RAN node.

In additional or alternative embodiments, responsive to receiving the message indicating the second RAN node is to provide dual connectivity to the UE, processor 1503 can provide dual connectivity to the UE and initiating setup of the second RAN node as the secondary node serving the UE.

In additional or alternative embodiments, responsive to receiving the message indicating the second RAN node is not to provide dual connectivity to the UE, processor 1503 can receive updated data from the first RAN node. The updated data can indicate updated characteristics of the UL channel between the UE and the second RAN node. Responsive to receiving the updated data, processor 1503 can estimate an updated UL quality based on the updated data and transmit, the updated UL quality to the first RAN node. Responsive to transmitting the updated UL quality to the first RAN node, processor 1503 can receive a subsequent message indicating whether the second RAN node is to provide dual connectivity to the UE by becoming the secondary node to the first RAN node and serving the UE.

Furthermore, various operations of FIGS. 17-20 may be optional with respect to some embodiments.

Example Embodiments are discussed below. Reference numbers/letters are provided in parenthesis by way of example/illustration without limiting example embodiments to particular elements indicated by reference numbers/letters.

Embodiment 1. A method of operating a first radio access network ("RAN") node in a communication network including: receiving (1710), by the first RAN node, data indicating characteristics of an uplink ("UL") channel of one or more UL channels for a second RAN node in the communication network; estimating (1730), by the first RAN node, an UL quality of the UL channel based on the data; and determining (1740), by the first RAN node and based on the UL quality, whether to provide dual connectivity to a user equipment ("UE") in the communication network by adding the second RAN node as a secondary node serving the UE.

Embodiment 2. The method of Embodiment 1, further including: receiving (1720), by the first RAN node, a message from the UE indicating that the UE detected a signal from the second RAN node. Estimating the UL quality can be responsive to receiving the message from the UE indicating that the UE detected the signal from the second RAN node.

Embodiment 3. The method of any of Embodiments 1-2, wherein the data includes first data indicating a transmit power used by the second RAN node to transmit a downlink ("DL") signal; second data indicating UL interference and noise ("I+N") in the UL channel; and third data indicating a receive power of the signal detected by the UE from the second RAN node.

Embodiment 4. The method of Embodiment 3, wherein receiving the data indicating characteristics of the UL channel includes: receiving, by the first RAN node, the first data from the second RAN node; receiving, by the first RAN node, the second data from the second RAN node; and receiving, by the first RAN node, the third data from the UE.

Embodiment 5. The method of any of Embodiments 3-4, wherein estimating the UL quality includes estimating a path loss based on the transmit power, the receive power, and the I+N; and determining transmit capabilities of the UE based on limitations of the UE and restrictions placed on the transmit capabilities of the UE by the communication network.

Embodiment 6. The method of any of Embodiments 3-5, wherein the transmit power is Secondary synchronization signal (SSS) power and the receive power is synchronized signal reference signal receive power ("SS-RSRP").

Embodiment 7. The method of any of Embodiments 3-5, wherein the transmit power is channel state information reference signal ("CSI-RS") power and the receive power is channel state information reference signal receive power ("CSI-RSRP").

Embodiment 8. The method of any of Embodiments 1-7, further including: responsive to determining to provide dual connectivity to the UE, initiating setup of the second RAN node as a secondary node serving the UE.

Embodiment 9. The method of any of Embodiments 1-7, further including: responsive to determining to not provide dual connectivity to the UE, providing, by the first RAN node, stand-alone connectivity to the UE; responsive to providing the stand-alone connectivity to the UE, receiving, by the first RAN node, updated data indicating updated characteristics of the UL channel for the second RAN node; estimating, by the first RAN node, an updated UL quality of the UL channel based on the updated data; and redetermining, by the first RAN node based on the updated UL quality, whether to provide dual connectivity to the UE by adding the second RAN node as a secondary node serving the UE.

Embodiment 10. The method of any of Embodiments 3-9, further including: responsive to determining to not provide dual connectivity to the UE, providing, by the first RAN node, stand-alone connectivity to the UE; responsive to providing the stand-alone connectivity to the UE, receiving, by the first RAN node, updated data indicating updated transmit power used by the second RAN node or updated receive power detected by the UE; and redetermining, by the first RAN node based on the updated transmit power or the updated receive power, whether to provide dual connectivity to the UE by adding the second RAN node as a secondary node serving the UE.

Embodiment 11. The method of any of Embodiments 1-10, wherein the first RAN node is a long term evolution ("LTE") base station ("eNB") and the second RAN node is a 5th Generation ("5G") base station ("gNB").

Embodiment 12. The method of any of Embodiments 1-10, wherein the first RAN node is a gNB and the second RAN node is an eNB.

Embodiment 13. The method of any of Embodiments 11-12, wherein receiving the data comprises receiving, by the first RAN node, an X2 interface setup message from the second RAN node, the X2 interface setup message including at least a portion of the data.

Embodiment 14. The method of any of Embodiments 1-10, wherein the first RAN node is a gNB and the second RAN node is a gNB.

Embodiment 15. The method of Embodiment 14, wherein receiving the data comprises receiving, by the first RAN node, an Xn interface setup request message from the second RAN node, the Xn interface setup message including at least a portion of the data.

Embodiment 16. The method of any of Embodiments 1-15, wherein estimating the UL quality is performed prior to setting up dual connectivity to the UE using the first RAN node and the second RAN node.

Embodiment 17. A method of operating a second radio access network ("RAN") node in a communication network including: determining (1810), by the second RAN node, data indicating characteristics of an uplink ("UL") channel of one or more UL channels for the second RAN node; transmitting (1820), by the second RAN node, the data to a first RAN node in the communication network; and responsive to transmitting the data to the first RAN node, receiving (1830), by the second RAN node, a message indicating whether the second RAN node is to provide dual connectivity to a user equipment ("UE") in the communication network by becoming a secondary node to the first RAN node and serving the UE.

Embodiment 18. The method of Embodiment 17, wherein the data includes: first data indicating a transmit power used by the second RAN node to transmit downlink ("DL") signals; and second data indicating UL interference and noise ("I+N") in the UL channel.

Embodiment 19. The method of Embodiment 18, wherein the transmit power is Secondary synchronization signal (SSS) power.

Embodiment 20. The method of Embodiment 18, wherein the transmit power is channel state information reference signal ("CSI-RS") power.

Embodiment 21. The method of any of Embodiments 17-20, further including: responsive to receiving the message indicating the second RAN node is to provide dual connectivity to the UE, providing, by the second RAN node, dual connectivity to the UE and initiating setup of the second RAN node as the secondary node serving the UE.

Embodiment 22. The method of any of Embodiments 17-21, further including: responsive to receiving the message indicating the second RAN node is not to provide dual connectivity to the UE: determining, by the second RAN node, updated data indicating updated characteristics of the UL channel for the second RAN node; determining, by the second RAN node, that a difference between the data and the updated data exceeds a threshold value; transmitting, by the second RAN node, the updated data to the first RAN node; and responsive to transmitting the updated data, receiving, by the second RAN node, another message indicating whether the second RAN node is to provide dual connectivity to the UE by becoming a secondary node to the first RAN node that serves the UE.

Embodiment 23. The method of any of Embodiments 17-22, wherein the first RAN node is a long term evolution ("LTE") base station ("eNB") and the second RAN node is a 5th Generation ("5G") base station ("gNB").

Embodiment 24. The method of any of Embodiments 17-22, wherein the first RAN node is a gNB and the second RAN node is an eNB.

Embodiment 25. The method of any of Embodiments 23-24, wherein transmitting the data comprises transmitting, by the second RAN node, an X2 interface setup message to the first RAN node, the X2 interface setup message including at least a portion of the data.

Embodiment 26. The method of any of Embodiments 17-22, wherein the first RAN node is a gNB and the second RAN node is an gNB.

Embodiment 27. The method of Embodiment 26, wherein transmitting the data comprises transmitting, by the second RAN node, an Xn interface setup message to the first RAN node, the Xn interface setup message including at least a portion of the data.

Embodiment 28. The method of any of Embodiments 17-27, wherein the message is received prior to setting up dual connectivity to the UE using the first RAN node and the second RAN node.

Embodiment 29. A method of operating a first radio access network ("RAN") node in a communication network including: transmitting (1920), by the first RAN node, data to a second RAN node in the communication network, the data indicating characteristics of an uplink ("UL") channel of one or more UL channels for the second RAN node; responsive to transmitting the data, receiving (1930), by the first RAN node from the second RAN node, an UL quality of the UL channel; and determining (1940), by the first RAN node and based on the UL quality, whether to provide dual connectivity to a user equipment ("UE") in the communication network by adding the second RAN node as a secondary node serving the UE.

Embodiment 30. The method of Embodiment 29, further including: receiving (1910), by the first RAN node, a message from the UE indicating that the UE detected a signal from the second RAN node, wherein transmitting the data is responsive to receiving the message from the UE indicating that the UE detected the signal from the second RAN node.

Embodiment 31. The method of any of Embodiments 29-30, wherein the data includes: first data indicating a receive power of the signal from the second RAN node detected by the UE; and second data indicating UL transmit capabilities of the UE.

Embodiment 32. The method of Embodiment 31, further including: receiving, by the first RAN node, the first data from the UE; receiving, by the first RAN node, transmit limitations of the UE from the UE; determining, by the first RAN node, transmit restrictions placed on the UE by the communication network; and determining, by the second RAN node, the second data indicating UL transmit capabilities of the UE based on the transmit limitations of the UE and the transmit restrictions placed on the UE.

Embodiment 33. The method of any of Embodiments 31-32, wherein the receive power is secondary synchronization signal reference signal receive power ("SS-RSRP").

Embodiment 34. The method of any of Embodiments 31-32, wherein the receive power is channel state information reference signal receive power ("CSI-RSRP").

Embodiment 35. The method of any of Embodiments 29-34, wherein determining whether to provide dual connectivity to the UE comprises determining whether the UL quality exceeds a threshold value.

Embodiment 36. The method of any of Embodiments 29-35, further including: responsive to determining to provide dual connectivity to the UE, initiating setup of the second RAN node as a secondary node serving the UE.

Embodiment 37. The method of any of Embodiments 29-35, further including: responsive to determining to not provide dual connectivity to the UE, providing, by the first RAN node, stand-alone connectivity to the UE; responsive to providing stand-alone connectivity to the UE, receiving, by the first RAN node, a subsequent message from the UE indicating that the UE detected a subsequent signal from the second RAN node; responsive to receiving the subsequent message, transmitting, by the first RAN node to the second RAN node, updated data indicating updated characteristics of the UL channel for the second RAN node; responsive to transmitting the updated data, receiving, by the first RAN node from the second RAN node, an updated UL quality of the UL channel for the second RAN node; and redetermining, by the first RAN node and based on the updated UL quality, whether to provide dual connectivity to the UE by adding the second RAN node as the secondary node serving the UE.

Embodiment 38. The method of any of Embodiments 29-35, further including: responsive to determining to not provide dual connectivity to the UE, providing, by the first RAN node, stand-alone connectivity to the UE; responsive to providing stand-alone connectivity to the UE, receiving, by the first RAN node, a subsequent message from the UE indicating that the UE detected a subsequent signal from the second RAN node; responsive to receiving the subsequent message, transmitting, by the first RAN node to the second RAN node, updated data indicating updated characteristics of the UL channel for the second RAN node; responsive to transmitting the updated data, receiving, by the first RAN node from the second RAN node, an updated transmit power of the second RAN node; and redetermining, by the first RAN node and based on the updated transmit power, whether to provide dual connectivity to the UE by adding the second RAN node as the secondary node serving the UE.

Embodiment 39. The method of any of Embodiments 29-38, wherein the first RAN node is a long term evolution ("LTE") base station ("eNB") and the second RAN node is a 5th Generation ("5G") base station ("gNB").

Embodiment 40. The method of any of Embodiments 29-38, wherein the first RAN node is a gNB and the second RAN node is an eNB.

Embodiment 41. The method of any of Embodiments 39-40, wherein transmitting the data comprises transmitting, by the first RAN node, an X2 interface setup message to the second RAN node, the X2 interface setup message including at least a portion of the data.

Embodiment 42. The method of any of Embodiments 29-38, wherein the first RAN node is a gNB and the second RAN node is a gNB.

Embodiment 43. The method of Embodiments 42, wherein transmitting the data comprises transmitting, by the first RAN node, an Xn interface setup message to the second RAN node, the Xn interface setup message including at least a portion of the data.

Embodiment 44. The method of any of Embodiments 29-43, wherein receiving the UL quality is performed prior to setting up dual connectivity to the UE using the first RAN node and the second RAN node.

Embodiment 45. A method of operating a second radio access network ("RAN") node in a communication network including: receiving (2010), by the second RAN node, data from a first RAN node in the communication network, the data indicating characteristics of an uplink ("UL") channel of one or more UL channels for the second RAN node; responsive to receiving the data from the first RAN node, estimating (2020), by the first RAN node, the UL quality of the UL channel based on the data; responsive to estimating the UL quality, transmitting (2030), by the second RAN node, the UL quality to the first RAN node; and responsive to transmitting the UL quality to the first RAN node, receiving (2040), by the second RAN node, a message indicating whether the second RAN node is to provide dual connectivity to a user equipment ("UE") in the communication network by becoming a secondary node to the first RAN node and serving the UE.

Embodiment 46. The method of Embodiment 45, wherein the data including: first data indicating a receive power of a signal transmitted by the second RAN node and detected by the UE; and second data indicating transmit capabilities of the UE.

Embodiment 47. The method of Embodiment 46 wherein receiving the data including: receiving, by the second RAN node, the first data from the first RAN node; and receiving, by the second RAN node, the second data from the first RAN node.

Embodiment 48. The method of any of Embodiments 46-47, further including: estimating, by the second RAN node, a transmit power used by the second RAN node to transmit downlink ("DL") signals; and estimating, by the second RAN node, UL interference and noise ("I+N") in the UL channel, wherein estimating the UL quality includes: estimating a path loss based on the transmit power, the receive power, and the I+N; and estimating a strength of a potential UL signal transmit by the UE based on the transmit capabilities of the UE and the path loss.

Embodiment 49. The method of Embodiment 48, wherein the transmit power is Secondary synchronization signal (SSS) power and the receive power is synchronized signal reference signal receive power ("SS-RSRP").

Embodiment 50. The method of Embodiment 48, wherein the transmit power is channel state information reference signal ("CSI-RS") power and the receive power is channel state information reference signal receive power ("CSI-RSRP").

Embodiment 51. The method of any of Embodiments 45-50, further including: responsive to receiving the message indicating the second RAN node is to provide dual connectivity to the UE, providing, by the second RAN node, dual connectivity to the UE and initiating setup of the second RAN node as the secondary node serving the UE.

Embodiment 52. The method of any of Embodiments 45-50, further including: responsive to receiving the message indicating the second RAN node is not to provide dual connectivity to the UE, receiving updated data from the first RAN node, the updated data indicating updated characteristics of the UL channel between the UE and the second RAN node; and responsive to receiving the updated data: estimating, by the second RAN node, an updated UL quality based on the updated data; responsive to estimating an updated UL quality of the UL channel, transmitting, by the second RAN node, the updated UL quality to the first RAN node; and responsive to transmitting the updated UL quality to the first RAN node, receiving, by the second RAN node, a subsequent message indicating whether the second RAN node is to provide dual connectivity to the UE by becoming the secondary node to the first RAN node and serving the UE.

Embodiment 53. The method of any of Embodiments 45-52, wherein the first RAN node is a long term evolution ("LTE") base station ("eNB") and the second RAN node is a 5th Generation ("5G") base station ("gNB").

Embodiment 54. The method of any of Embodiments 45-52, wherein the first RAN node is a gNB and the second RAN node is an eNB.

Embodiment 55. The method of any of Embodiments 53-54, wherein receiving the data comprises receiving, by the second RAN node, an X2 interface setup message from the first RAN node, the X2 interface setup message including at least a portion of the data.

Embodiment 56. The method of any of Embodiments 45-52, wherein the first RAN node is a gNB and the second RAN node is an gNB.

Embodiment 57. The method of Embodiment 56, wherein receiving the data comprises receiving, by the second RAN node, an Xn interface setup message from the first RAN node, the Xn interface setup message including at least a portion of the data.

Embodiment 58. The method of any of Embodiments 45-57, wherein estimating the UL quality is performed prior to setting up dual connectivity to the UE using the first RAN node and the second RAN node.

Explanations for abbreviations from the above disclosure are provided below.

| Abbreviation | Explanation |
| --- | --- |
| 3G | 3rd Generation Mobile System |
| 3GPP | 3rd Generation Partnership Project |
| 4G | 4th Generation Mobile System |
| 5G | 5th Generation |
| 5GC | 5th Generation Core Network |
| 5GS | 5th Generation System |
| AMF | Access and Mobility management Function |
| ARFCN | Absolute Radio Frequency Number |
| BW | Bandwidth |
| CA | Carrier Aggregation |
| CGI | Cell Global Identity |
| CHO | Conditional Handover |
| CN | Core Network |
| CRM | Customer Relationship Management |
| CSI | Channel State Information |
| CSI-RS | Channel State Information Reference Signal |
| CSI-RSRP | CSI Reference Signal Received Power |
| CSP | Connectivity Service Provider (e.g., mobile operator) |
| DL | Downlink |
| EARFCN | E-UTRA Absolute Radio Frequency Number |
| ECGI | E-UTRA Cell Global Identity |
| eNB | Evolved NodeB |
| EN-DC | EUTRAN-NR Dual Connectivity |
| en-gNB | E-UTRA-NR-gNB |
| EPC | Evolved Packet Core |
| EPS | Evolved Packet System |
| E-UTRA | Evolved Universal Terrestrial Radio Access |
| E-UTRAN | Evolved Universal Terrestrial Radio Access Network |
| gNB | Radio base station in NR. |
| HO | Handover |
| IE | Information Element |
| IFLB | Inter-Frequency Load Balancing |
| IMMCI | Idle Mode Mobility Carrier Info |
| IPX | Internet Packet Exchange Point |
| ISP | Internet Service Provider |
| I + N | Interference and Noise |
| LTE | Long Term Evolution |
| MCG | Master Cell Group |
| MeNB | Master eNB |
| MME | Mobility Management Entity |
| MR-DC | Multi-RAT Dual Connectivity |
| NAS | Non Access Stratum |
| NE-DC | NR-E-UTRA Dual Connectivity |
| NF | Network Function |
| ng-eNB | $5^{th}$ Generation eNB |
| NG-RAN | 5th Generation Radio Access Network |
| NR | New Radio |
| NR-NR DC | New Radio New Radio Dual Connectivity |
| NR NSA | NR Non-Stand-Alone |
| NR SA | NR Stand-Alone |
| NSA | Non-Stand Alone |
| NWDAF | Network Data Analytics Function |
| OTT | Over The Top application |
| PCell | Primary Cell |
| PSCell | Primary Secondary Cell |
| RAN | Radio Access Network |
| RAT | Radio Access Technology |
| RCF | Radio Control Function |
| RN | Radio Node |
| RSRP | Reference Signal Receive Power |
| RSRQ | Reference Signal Received Quality |
| RSSI | Received Signal Strength Indicator |
| RRC | Radio Resource Control |
| SA | Standalone |
| SCell | Secondary Cell |
| SCG | Secondary Cell Group |
| SCS | Sub-carrier Spacing |
| SIB | System Information Block |
| SINR | Signal to Interference and Noise Ratio |
| SPR | Service Provider Infrastructure |

-continued

| Abbreviation | Explanation |
| --- | --- |
| SRVCC | Single Radio Voice Call Continuity |
| SSB | Synchronization Signal Block |
| SS-RSRP | Synchronization Signal based RSRP |
| SS-RSRQ | Synchronization Signal based RSRQ |
| SS-SINR | Synchronization Signal based SINR |
| S-GW | Serving Gateway |
| UE | User Equipment |
| UL | Uplink |
| UTRAN | Universal Terrestrial Radio Access Network |
| VNF | Virtualized Network Function |
| VNFI | Virtualized Network Function Infrastructure |
| X2 | Interface between eNBs |
| X2AP | X2 Application Protocol |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 21:
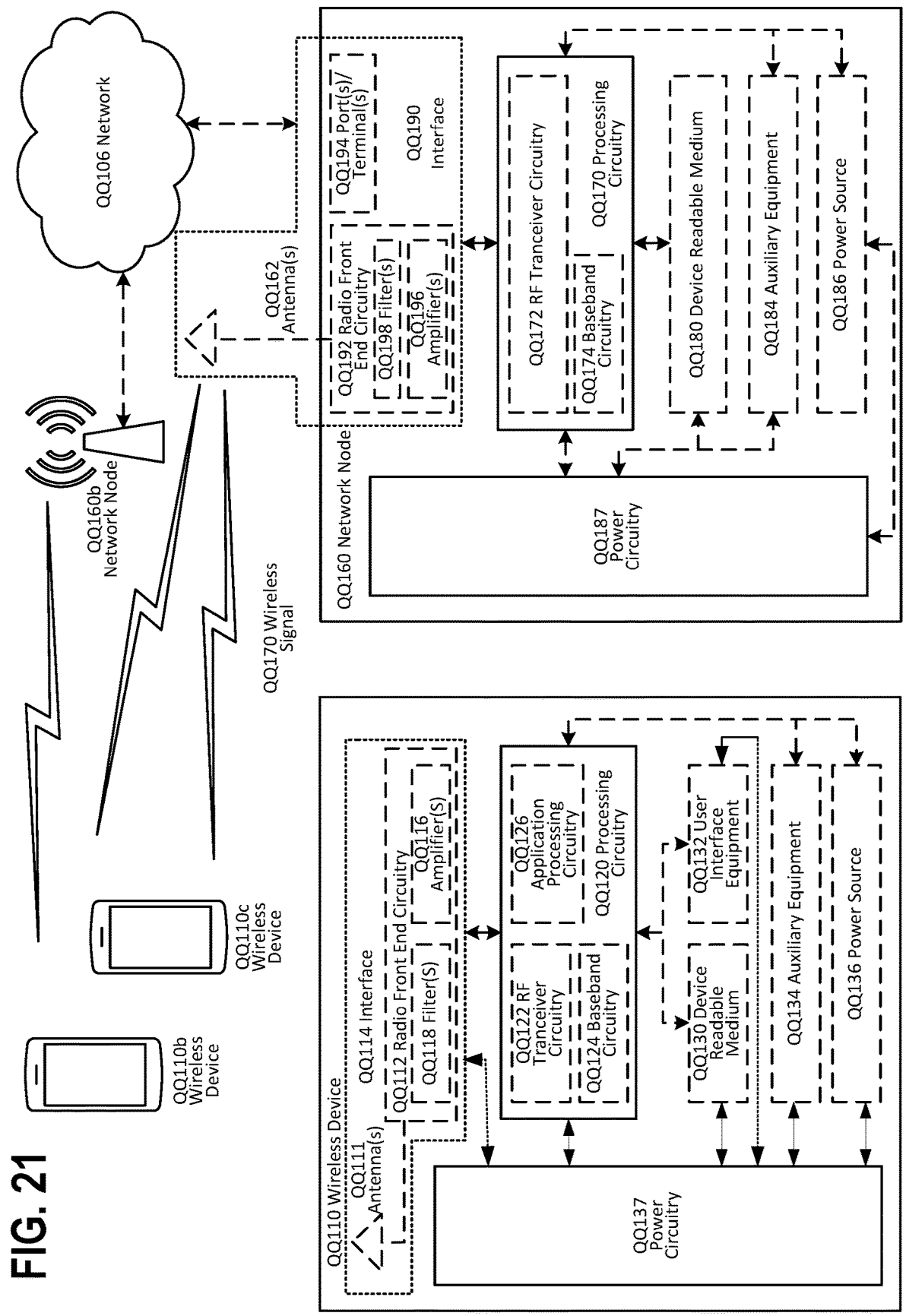
FIG. 21 is a block diagram of a wireless network in accordance with some embodiments.

FIG. 21: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 21 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 22:
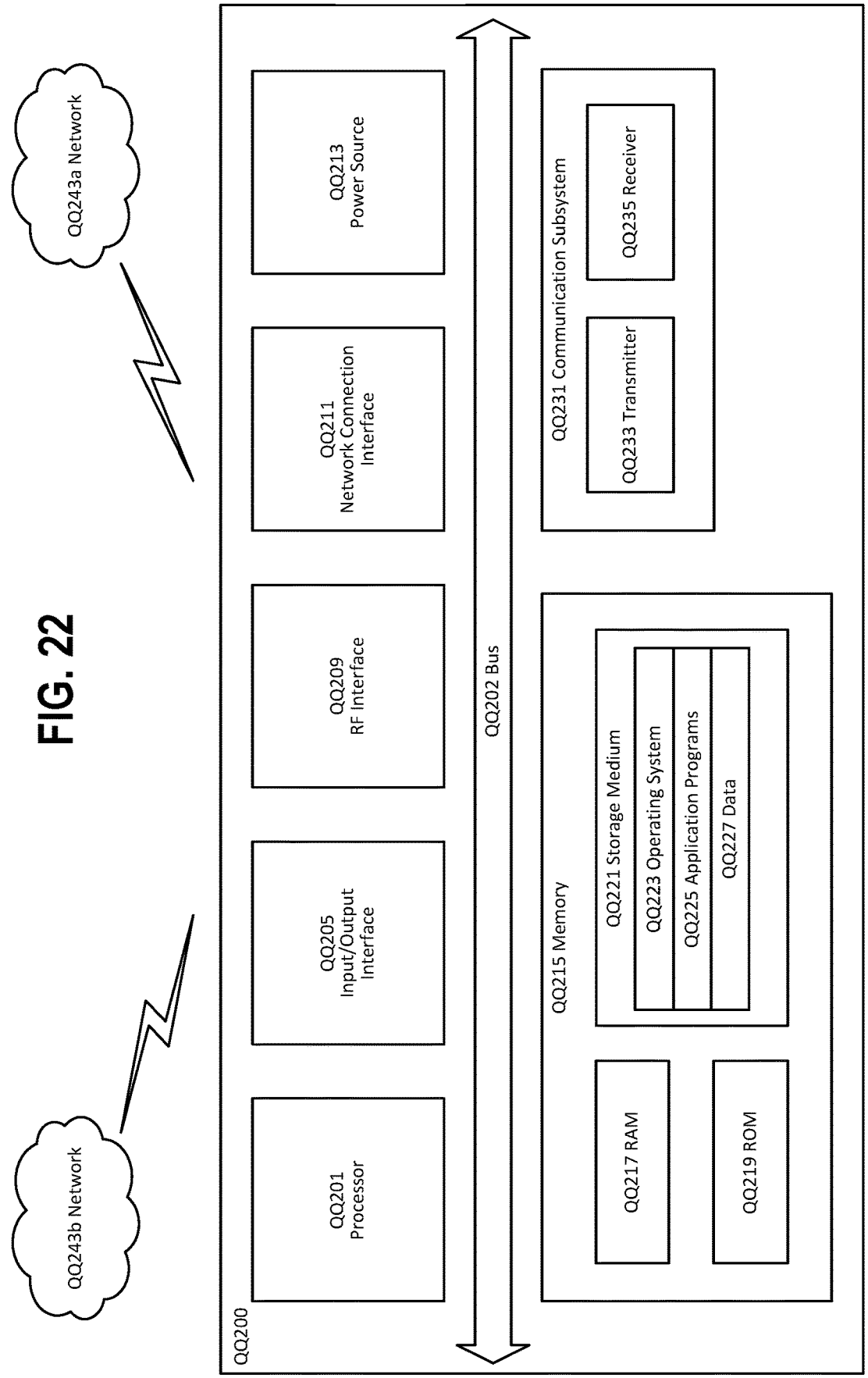
FIG. 22 is a block diagram of a user equipment in accordance with some embodiments

FIG. 22: User Equipment in accordance with some embodiments

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 22, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 22, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 23:
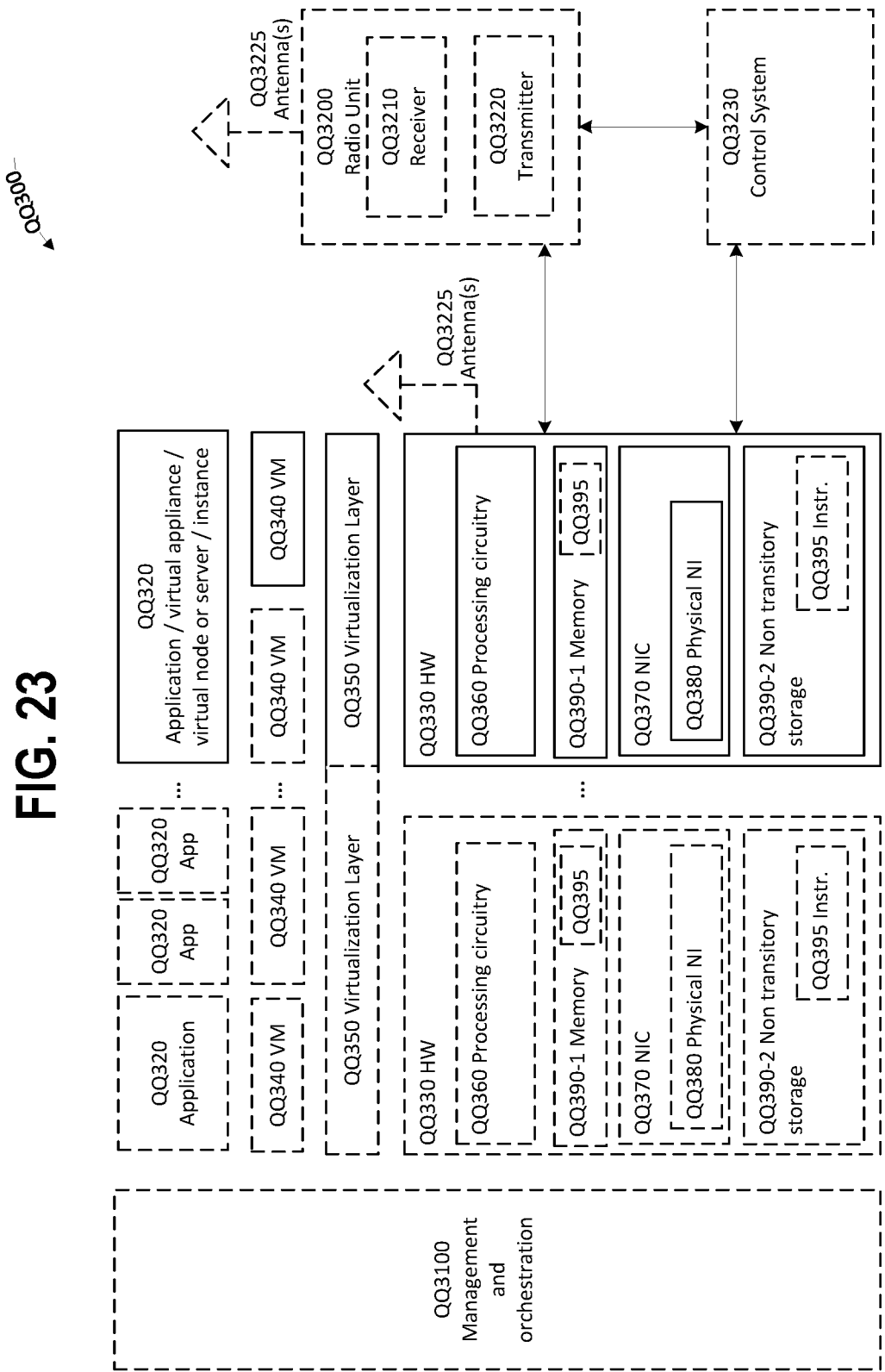
FIG. 23 is a block diagram of a virtualization environment in accordance with some embodiments.

FIG. 23: Virtualization environment in accordance with some embodiments

FIG. 23 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 23, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 23.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 24:
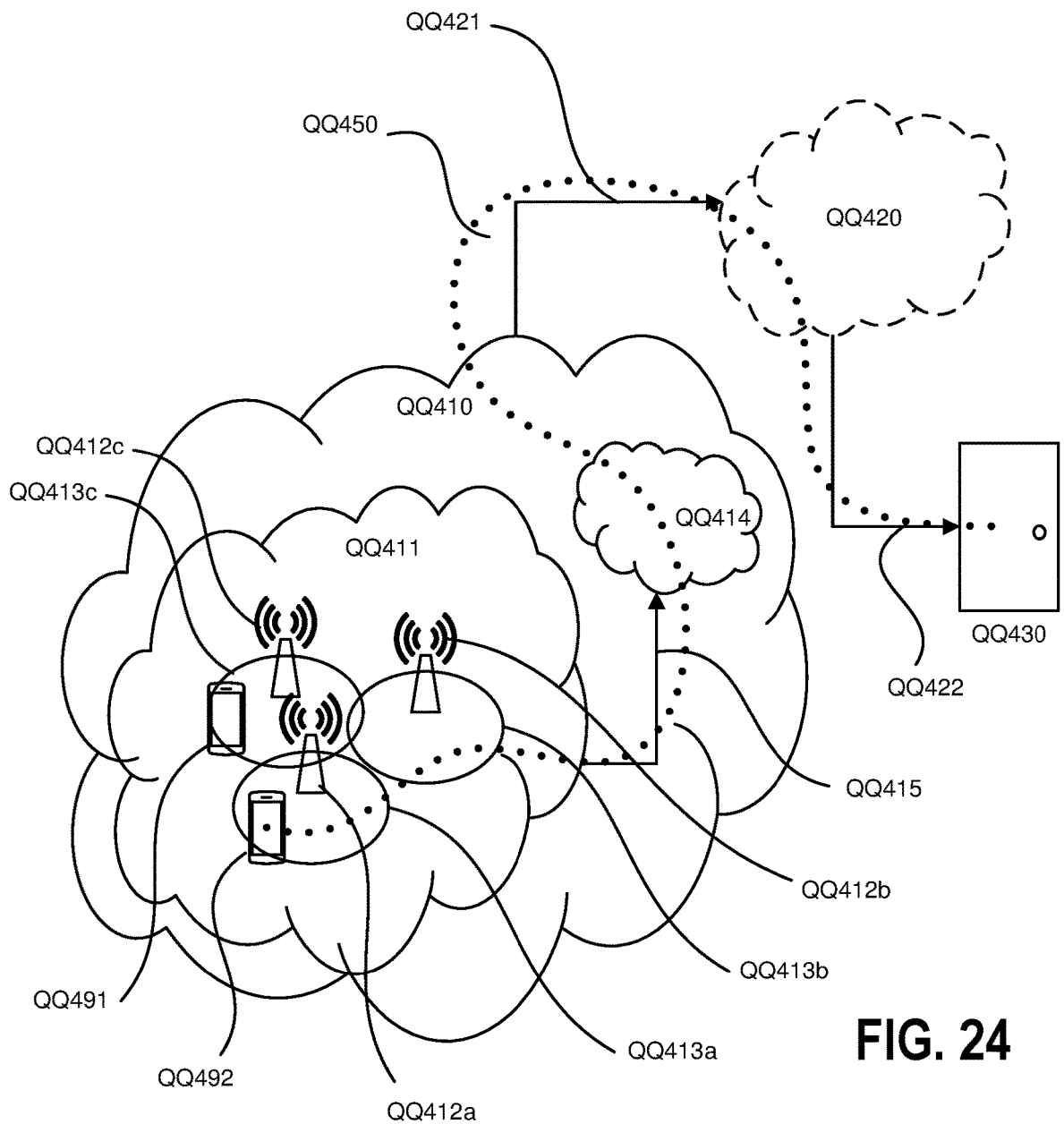
FIG. 24 is a block diagram of a telecommunication network connected via an intermediate network to a host computer in accordance with some embodiments.

FIG. 24: Telecommunication network connected via an intermediate network to a host computer in accordance with some embodiments.

With reference to FIG. 24, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 24 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 25:
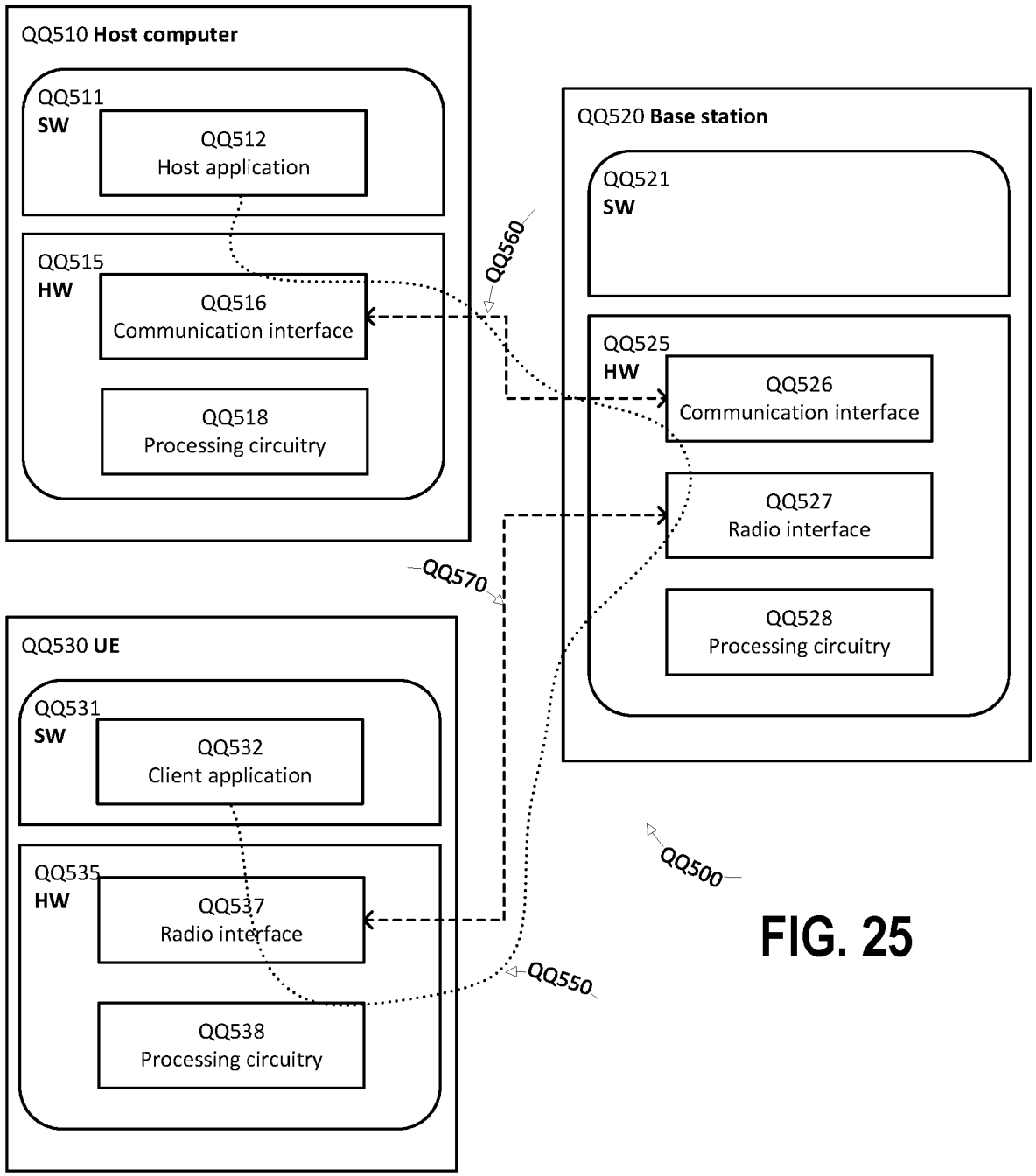
FIG. 25 is a block diagram of a host computer communicating via a base station with a user equipment over a partially wireless connection in accordance with some embodiments.

FIG. 25: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 25. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 25) served by base station QQ520. Communication interface QQ526 may be configured to facilitate connection QQ560 to host computer QQ510. Connection QQ560 may be direct or it may pass through a core network (not shown in FIG. 25) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 25 may be similar or identical to host computer QQ430, one of base stations QQ412a, QQ412b, QQ412c and one of UEs QQ491, QQ492 of FIG. 24, respectively. This is to say, the inner workings of these entities may be as shown in FIG. 25 and independently, the surrounding network topology may be that of FIG. 24.

In FIG. 25, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 26:
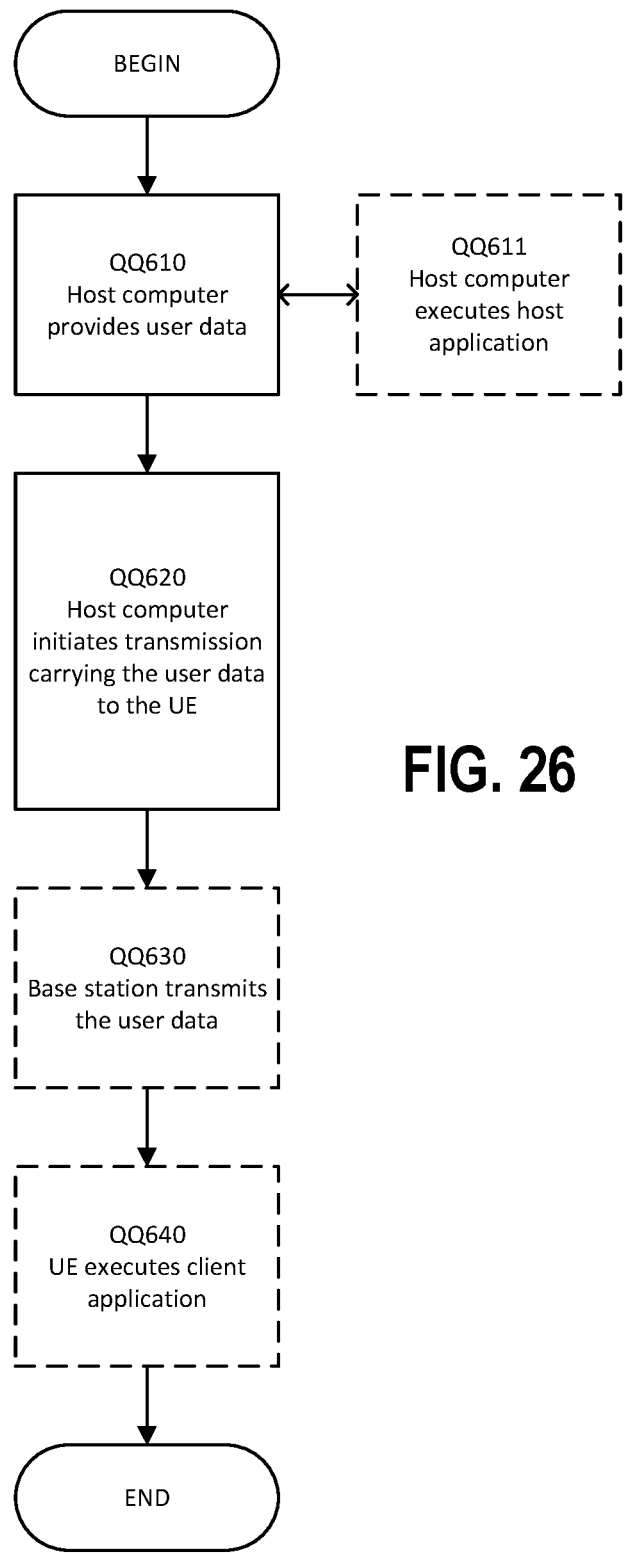
FIG. 26 is a block diagram of methods implemented in a communication system including a host computer, a base station, and a user equipment in accordance with some embodiments.

FIG. 26: Methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 26 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 27:
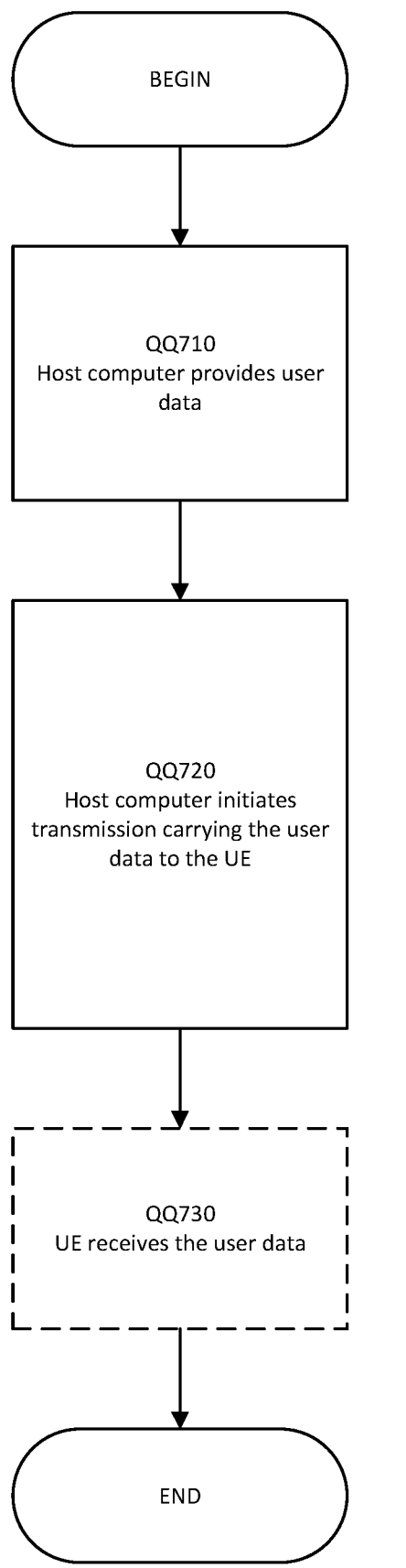
FIG. 27 is a block diagram of methods implemented in a communication system including a host computer, a base station, and a user equipment in accordance with some embodiments.

FIG. 27: Methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 27 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 28:
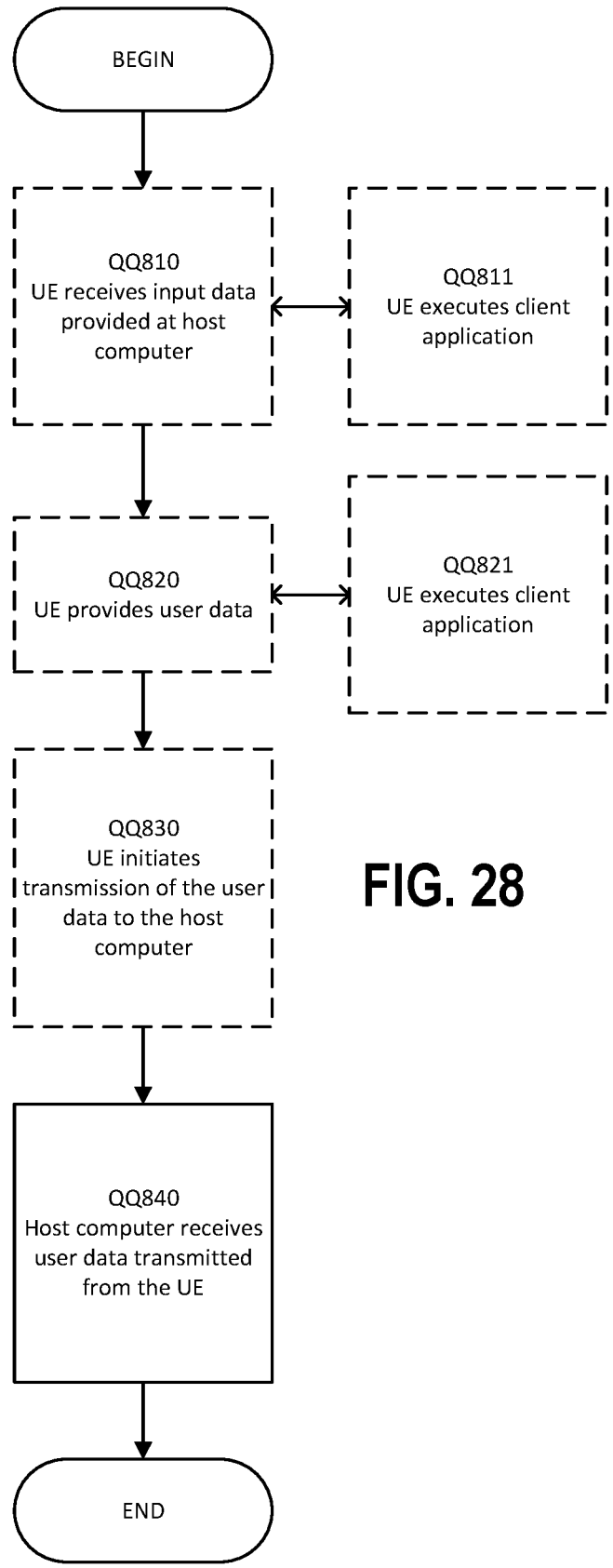
FIG. 28 is a block diagram of methods implemented in a communication system including a host computer, a base station, and a user equipment in accordance with some embodiments.

FIG. 28: Methods implemented in a communication system including a host computer, a base station and a user equipment in accordance with some embodiments.

FIG. 28 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 28 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 29:
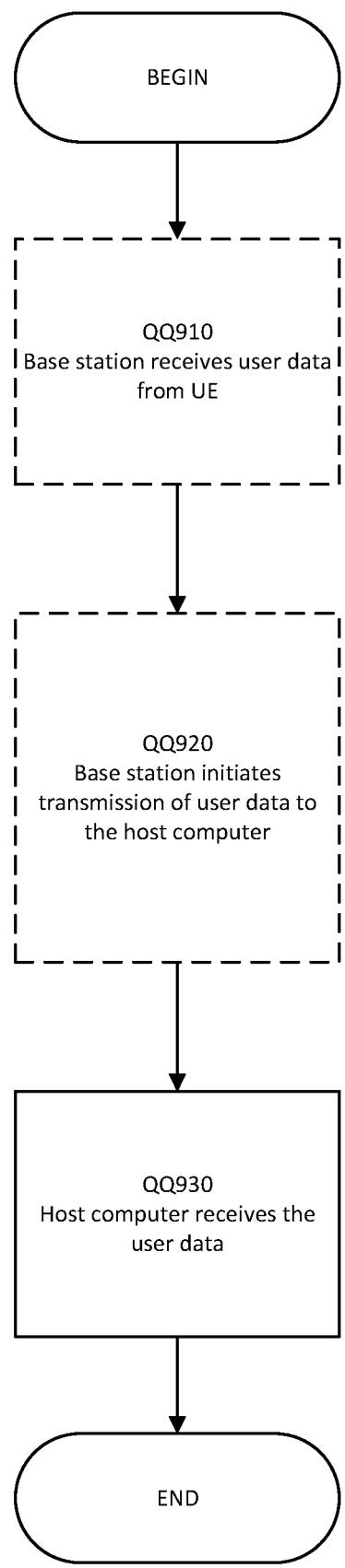
FIG. 29 is a block diagram of methods implemented in a communication system including a host computer, a base station, and a user equipment in accordance with some embodiments.

FIG. 29: Methods implemented in a communication system including a host computer, a base station and a user equipment in accordance with some embodiments.

FIG. 29 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 29 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a first radio access network, RAN, node in a communication network comprising:
   receiving, by the first RAN node, data indicating characteristics of an uplink, UL, channel of one or more UL channels for a second RAN node in the communication network, the data comprising:
      first data indicating a transmit power used by the second RAN node to transmit a downlink, DL, signal;
      second data indicating UL interference and noise, I+N, in the UL channel; and
      third data indicating a receive power of the signal detected by the UE from the second RAN node;
   estimating, by the first RAN node, an UL quality of the UL channel based on the data, estimating the UL quality comprising:
      estimating a path loss based on the transmit power, the receive power, and the I+N; and
      determining transmit capabilities of the UE based on limitations of the UE and restrictions placed on the transmit capabilities of the UE by the communication network; and
   determining, by the first RAN node and based on the UL quality, whether to provide dual connectivity to a user equipment, UE, in the communication network by adding the second RAN node as a secondary node serving the UE.

2. The method of claim 1, further comprising:
   receiving, by the first RAN node, a message from the UE indicating that the UE detected a signal from the second RAN node, wherein estimating the UL quality is responsive to receiving the message from the UE indicating that the UE detected the signal from the second RAN node.

3. The method of claim 1, wherein receiving the data indicating characteristics of the UL channel comprises:
   receiving, by the first RAN node, the first data from the second RAN node;
   receiving, by the first RAN node, the second data from the second RAN node; and
   receiving, by the first RAN node, the third data from the UE.

4. The method of claim 1, wherein the transmit power is Secondary synchronization signal, SSS, power and the receive power is synchronized signal reference signal receive power, SS-RSRP.

5. The method of claim 1, wherein the transmit power is channel state information reference signal, CSI-RS, power and the receive power is channel state information reference signal receive power, CSI-RSRP.

6. The method of claim 1, further comprising:
   responsive to determining to provide dual connectivity to the UE, initiating setup of the second RAN node as a secondary node serving the UE.

7. The method of claim 1, further comprising:
   responsive to determining to not provide dual connectivity to the UE, providing, by the first RAN node, stand-alone connectivity to the UE;
   responsive to providing the stand-alone connectivity to the UE, receiving, by the first RAN node, updated data indicating updated characteristics of the UL channel for the second RAN node;
   estimating, by the first RAN node, an updated UL quality of the UL channel based on the updated data; and
   redetermining, by the first RAN node based on the updated UL quality, whether to provide dual connectivity to the UE by adding the second RAN node as a secondary node serving the UE.

8. The method of claim 1, further comprising:
   responsive to determining to not provide dual connectivity to the UE, determining, by the first RAN node, a carrier aggregation based on the UL quality.

9. The method of claim 1, further comprising:
   responsive to determining to not provide dual connectivity to the UE, providing, by the first RAN node, stand-alone connectivity to the UE;
   responsive to providing the stand-alone connectivity to the UE, receiving, by the first RAN node, updated data indicating updated transit power used by the second RAN node or updated receive power detected by the UE; and
   redetermining, by the first RAN node based on the updated transmit power or the updated receive power, whether to provide dual connectivity to the UE by adding the second RAN node as a secondary node serving the UE.

10. The method of claim 1, wherein estimating the UL quality is performed prior to setting up dual connectivity to the UE using the first RAN node and the second RAN node.

11. A method of operating a second radio access network, RAN, node in a communication network comprising:
   determining, by the second RAN node, data indicating characteristics of an uplink, UL, channel of one or more UL channels for the second RAN node;

transmitting, by the second RAN node, the data to a first RAN node in the communication network;
responsive to transmitting the data to the first RAN node, receiving, by the second RAN node, a message indicating whether the second RAN node is to provide dual connectivity to a user equipment, UE, in the communication network by becoming a secondary node to the first RAN node and serving the UE; and
responsive to receiving the message indicating the second RAN node is not to provide dual connectivity to the UE:
determining, by the second RAN node, updated data indicating updated characteristics of the UL channel for the second RAN node;
determining, by the second RAN node, that a difference between the data and the updated data exceeds a threshold value;
transmitting, by the second RAN node, the updated data to the first RAN node; and
responsive to transmitting the updated data, receiving, by the second RAN node, another message indicating whether the second RAN node is to provide dual connectivity to the UE by becoming a secondary node to the first RAN node that serves the UE.

12. The method of claim 11, wherein the data comprises:
first data indicating a transmit power used by the second RAN node to transmit downlink, DL, signals; and
second data indicating UL interference and noise, I+N, in the UL channel.

13. The method of claim 12, wherein the transmit power is Secondary synchronization signal, SSS, power.

14. The method of claim 12, wherein the transmit power is channel state information reference signal, CSI-RS, power.

15. The method of claim 11, further comprising:
responsive to receiving the message indicating the second RAN node is to provide dual connectivity to the UE, providing, by the second RAN node, dual connectivity to the UE and initiating setup of the second RAN node as the secondary node serving the UE.

16. The method of claim 11, wherein the message is received prior to setting up dual connectivity to the UE using the first RAN node and the second RAN node.

17. A first radio access network, RAN, node operable in a communication network, the first RAN node comprising:
a processing circuit; and
a memory coupled to the processing circuit, the memory storing machine-readable computer program instructions that, when executed by the processing circuit, cause the processing circuit to:
receive data indicating characteristics of an uplink, UL, channel of one or more UL channels for a second RAN node in the communication network, the data comprising:
first data indicating a transmit power used by the second RAN node to transmit a downlink, DL, signal;
second data indicating UL interference and noise, I+N, in the UL channel; and
third data indicating a receive power of the signal detected by the UE from the second RAN node;
estimate an UL quality of the UL channel based on the data, estimating the UL quality comprising:
estimating a path loss based on the transmit power, the receive power, and the I+N; and
determining transmit capabilities of the UE based on limitations of the UE and restrictions placed on the transmit capabilities of the UE by the communication network; and
determine, based on the UL quality, whether to provide dual connectivity to a user equipment, UE, in the communication network by adding the second RAN node as a secondary node serving the UE.

* * * * *